United States Patent
Tourapis et al.

(10) Patent No.: US 10,250,883 B2
(45) Date of Patent: Apr. 2, 2019

(54) CHROMA QUANTIZATION IN VIDEO CODING

(71) Applicant: Apple Inc., Cupertino, CA (US)

(72) Inventors: Alexandros Tourapis, Los Gatos, CA (US); Guy Cote, Aptos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/342,128

(22) Filed: Nov. 3, 2016

(65) Prior Publication Data

US 2017/0078667 A1    Mar. 16, 2017

Related U.S. Application Data

(63) Continuation of application No. 14/452,485, filed on Aug. 5, 2014, now Pat. No. 9,510,002.

(Continued)

(51) Int. Cl.
*H04N 19/124* (2014.01)
*H04N 19/13* (2014.01)
(Continued)

(52) U.S. Cl.
CPC ......... *H04N 19/124* (2014.11); *H04N 19/126* (2014.11); *H04N 19/13* (2014.11);
(Continued)

(58) Field of Classification Search
CPC .. H04N 19/186; H04N 19/124; H04N 19/176; H04N 19/70; H04N 19/126;
(Continued)

(56) References Cited

U.S. PATENT DOCUMENTS

| | | | |
|---|---|---|---|
| 6,417,891 B1 * | 7/2002 | Cacciatore | G06T 11/001 348/631 |
| 7,474,697 B2 | 1/2009 | Roh | |

(Continued)

FOREIGN PATENT DOCUMENTS

| | | |
|---|---|---|
| AU | 2014216004 | 3/2015 |
| AU | 2014216004 | 2/2016 |

(Continued)

OTHER PUBLICATIONS

Hellman, Tim, et al., "Changing_cu_qp_delta Parsing to Enable CU-level Processing," Joint Collaborative Team on Video Coding (JCT-VC) of ITU-T SG16 WP 3 and ISO/IEC JTC 1/SC 29/WG 11 9th Meeting, Apr. 27-May 4, 2012, 11 pages, Geneva, CH.

(Continued)

*Primary Examiner* — Dave Czekaj
*Assistant Examiner* — Kehinde Abimbola
(74) *Attorney, Agent, or Firm* — Adeli LLP

(57) ABSTRACT

A method of signaling additional chroma QP offset values that are specific to quantization groups is provided, in which each quantization group explicitly specifies its own set of chroma QP offset values. Alternatively, a table of possible sets of chroma QP offset values is specified in the header area of the picture, and each quantization group uses an index to select an entry from the table for determining its own set of chroma QP offset values. The quantization group specific chroma QP offset values are then used to determine the chroma QP values for blocks within the quantization group in addition to chroma QP offset values already specified for higher levels of the video coding hierarchy.

17 Claims, 20 Drawing Sheets

Related U.S. Application Data

(60) Provisional application No. 61/875,664, filed on Sep. 9, 2013.

(51) Int. Cl.

| | | |
|---|---|---|
| *H04N 19/15* | (2014.01) | |
| *H04N 19/159* | (2014.01) | |
| *H04N 19/51* | (2014.01) | |
| *H04N 19/61* | (2014.01) | |
| *H04N 19/86* | (2014.01) | |
| *H04N 19/30* | (2014.01) | |
| *H04N 19/70* | (2014.01) | |
| *H04N 19/126* | (2014.01) | |
| *H04N 19/186* | (2014.01) | |
| *H04N 19/157* | (2014.01) | |
| *H04N 19/136* | (2014.01) | |
| *H04N 19/96* | (2014.01) | |
| *H04N 19/172* | (2014.01) | |
| *H04N 19/176* | (2014.01) | |

(52) U.S. Cl.
CPC ........... *H04N 19/136* (2014.11); *H04N 19/15* (2014.11); *H04N 19/157* (2014.11); *H04N 19/159* (2014.11); *H04N 19/186* (2014.11); *H04N 19/30* (2014.11); *H04N 19/51* (2014.11); *H04N 19/61* (2014.11); *H04N 19/70* (2014.11); *H04N 19/86* (2014.11); *H04N 19/172* (2014.11); *H04N 19/176* (2014.11); *H04N 19/96* (2014.11)

(58) Field of Classification Search
CPC .... H04N 19/172; H04N 19/61; H04N 19/159; H04N 19/13; H04N 19/86; H04N 19/136; H04N 19/15; H04N 19/30; H04N 19/157; H04N 19/593; H04N 19/182
See application file for complete search history.

(56) References Cited

U.S. PATENT DOCUMENTS

| | | | |
|---|---|---|---|
| 8,654,839 B2 * | 2/2014 | Arakawa | H04N 19/172 |
| | | | 375/240.03 |
| 8,780,981 B2 | 7/2014 | Matsunobu et al. | |
| 8,824,789 B2 | 9/2014 | Nakanishi | |
| 8,831,086 B2 | 9/2014 | Ye et al. | |
| 9,294,766 B2 | 3/2016 | Tourapis et al. | |
| 9,414,054 B2 | 8/2016 | Sullivan et al. | |
| 9,591,302 B2 * | 3/2017 | Sullivan | H04N 19/70 |
| 9,781,421 B2 * | 10/2017 | Sullivan | H04N 19/124 |
| 2001/0028749 A1 | 10/2001 | Kimura | |
| 2001/0033619 A1 | 10/2001 | Hanamura et al. | |
| 2002/0001411 A1 | 1/2002 | Suzuki et al. | |
| 2002/0054638 A1 | 5/2002 | Hanamura et al. | |
| 2002/0094025 A1 | 7/2002 | Hanamura et al. | |
| 2003/0039310 A1 | 2/2003 | Wu et al. | |
| 2004/0101059 A1 | 5/2004 | Joch et al. | |
| 2004/0105508 A1 | 6/2004 | Kim et al. | |
| 2004/0184536 A1 | 9/2004 | Roh | |
| 2005/0168650 A1 | 8/2005 | Walls et al. | |
| 2005/0254580 A1 | 11/2005 | Roh | |
| 2005/0271140 A1 * | 12/2005 | Hanamura | H04N 21/234327 |
| | | | 375/240.12 |
| 2006/0018559 A1 | 1/2006 | Kim et al. | |
| 2006/0087590 A1 | 4/2006 | Yang et al. | |
| 2006/0177143 A1 | 8/2006 | Winger | |
| 2006/0227869 A1 | 10/2006 | Joch et al. | |
| 2007/0071093 A1 | 3/2007 | Shi et al. | |
| 2007/0092001 A1 * | 4/2007 | Arakawa | H04N 11/042 |
| | | | 375/240.03 |
| 2008/0062443 A1 | 3/2008 | Olson | |
| 2008/0137752 A1 | 6/2008 | He | |
| 2008/0170620 A1 | 7/2008 | Zhang | |
| 2008/0240252 A1 | 10/2008 | He | |
| 2008/0260041 A1 | 10/2008 | Au et al. | |
| 2009/0034621 A1 | 2/2009 | Joch et al. | |
| 2009/0175334 A1 | 7/2009 | Ye et al. | |
| 2009/0190829 A1 | 7/2009 | Suzuki et al. | |
| 2009/0290789 A1 * | 11/2009 | Burns | G09G 3/2003 |
| | | | 382/162 |
| 2009/0296808 A1 | 12/2009 | Regunathan et al. | |
| 2010/0086025 A1 | 4/2010 | Chen et al. | |
| 2010/0202513 A1 * | 8/2010 | Arakawa | H04N 19/172 |
| | | | 375/240.03 |
| 2010/0225806 A1 | 9/2010 | Hsu et al. | |
| 2010/0322303 A1 | 12/2010 | Wada et al. | |
| 2011/0261880 A1 | 10/2011 | Auyeung | |
| 2012/0002723 A1 * | 1/2012 | Arakawa | H04N 19/597 |
| | | | 375/240.03 |
| 2012/0314764 A1 | 12/2012 | Tidemann et al. | |
| 2013/0051457 A1 | 2/2013 | Joshi et al. | |
| 2013/0101033 A1 | 4/2013 | Joshi et al. | |
| 2013/0114678 A1 * | 5/2013 | Baylon | H04N 19/176 |
| | | | 375/240.02 |
| 2013/0142255 A1 | 6/2013 | Matsunobu et al. | |
| 2013/0188693 A1 | 7/2013 | Xu et al. | |
| 2013/0188744 A1 | 7/2013 | Auwera et al. | |
| 2013/0243315 A1 | 9/2013 | Nakanishi | |
| 2013/0315305 A1 | 11/2013 | Matsunobu et al. | |
| 2013/0329785 A1 | 12/2013 | Lim et al. | |
| 2014/0003497 A1 | 1/2014 | Sullivan et al. | |
| 2014/0003498 A1 * | 1/2014 | Sullivan | H04N 19/70 |
| | | | 375/240.03 |
| 2014/0092999 A1 | 4/2014 | Dong et al. | |
| 2014/0169447 A1 | 6/2014 | Hellman | |
| 2014/0254677 A1 | 9/2014 | Oh et al. | |
| 2014/0286401 A1 | 9/2014 | Matsunobu et al. | |
| 2014/0328392 A1 | 11/2014 | Han et al. | |
| 2014/0328393 A1 | 11/2014 | Han et al. | |
| 2014/0328394 A1 | 11/2014 | Han et al. | |
| 2014/0334559 A1 * | 11/2014 | Kim | H04N 19/91 |
| | | | 375/240.29 |
| 2015/0003536 A1 | 1/2015 | Zhu et al. | |
| 2015/0043641 A1 * | 2/2015 | Gamei | H04N 19/122 |
| | | | 375/240.12 |
| 2015/0063457 A1 * | 3/2015 | Gamei | H04N 19/122 |
| | | | 375/240.16 |
| 2015/0071344 A1 | 3/2015 | Tourapis et al. | |
| 2015/0078447 A1 * | 3/2015 | Gamei | H04N 19/122 |
| | | | 375/240.12 |
| 2015/0085924 A1 * | 3/2015 | Gamei | H04N 19/122 |
| | | | 375/240.03 |
| 2015/0103898 A1 | 4/2015 | Ye et al. | |
| 2016/0094850 A1 | 3/2016 | Matsunobu et al. | |
| 2016/0100170 A1 | 4/2016 | Tourapis et al. | |
| 2016/0373750 A1 * | 12/2016 | Xu | H04N 19/70 |
| 2016/0373751 A1 * | 12/2016 | Xu | H04N 19/70 |
| 2017/0134728 A1 * | 5/2017 | Sullivan | H04N 19/124 |
| 2017/0324955 A1 | 11/2017 | Lim et al. | |
| 2017/0353725 A1 * | 12/2017 | Sullivan | H04N 19/15 |
| 2017/0359576 A1 * | 12/2017 | Gamei | H04N 19/122 |

FOREIGN PATENT DOCUMENTS

| | | |
|---|---|---|
| AU | 2016200770 A1 | 2/2016 |
| AU | 2018203223 A1 | 5/2018 |
| CN | 100546388 C | 9/2009 |
| EP | 2249572 A1 | 11/2010 |
| EP | 2854404 | 4/2015 |
| EP | 14181146.3 | 1/2016 |
| JP | 2011-524130 | 8/2011 |
| RU | 2189120 C2 | 9/2002 |
| RU | 2010132652 A | 2/2012 |
| TW | 201028009 A | 7/2010 |
| WO | 9810593 A2 | 3/1998 |
| WO | 2003007126 A2 | 1/2003 |
| WO | 2010041488 A1 | 4/2010 |
| WO | WO 2013/108688 | 7/2013 |

(56) References Cited

FOREIGN PATENT DOCUMENTS

WO     WO 2015/035092     3/2015
WO    PCT/US2014/054152    6/2015

OTHER PUBLICATIONS

Sullivan, Gary J., et al., "Chroma QP Range Extension," Joint Collaborative Team on Video Coding (JCT-VC) of ITU-T SG16 WP 3 and ISO/IEC JTC 1/SC 29/WG 11 10th Meeting, Jul. 11-20, 2012, 8 pages, Stockholm, SE.
Author Unknown, "Series H: Audiovisual and Multimedia Systems, Infrastructure of audiovisual services—Coding of moving video, High efficiency video coding," H.265, Apr. 2013, 317 pages, ITU-T Telecommunication Standardization Sector of ITU.
Bross, Benjamin, et al., "High efficiency video coding (HEVC) text specification draft 7," Joint Collaborative Team on Video Coding (JCT-VC) of ITU-T SG16 WP3 and ISO/IEC JTC1/SC29/WG11, Apr. 27-May 7, 2012, 280 pages, Geneva, CH.
Bross, Benjamin, et al., "High efficiency video coding (HEVC) text specification draft 8," Joint Collaborative Team on Video Coding (JCT-VC) of ITU-T SG16 WP3 and ISO/IEC JTC1/SC29/WG11, Jul. 11-20, 2012, 261 pages, Stockholm, SE.
Flynn, David, et al., "High Efficiency Video Coding (HEVC) Range Extensions text specification: Draft 4," Joint Collaborative Team on Video Coding (JCT-VC) of ITU-T SG 16 WP3 and ISO/IEC JTC 1/SC 29/WG11, Apr. 18-26, 2013, 12 pages, Incheon, South Korea.
Li, Xiang,, et al., "Adaptive Quantization Parameter Cascading for Hierarchichal Video Coding," Proceedings of 2010 IEEE International Symposium on Circuits and Systems, May 30, 2010, 5 pages, IEEE, Paris, France.
Liu, Shan, et al., "Support of ChromaQPOffset in HEVC," Joint Collaborative Team on Video Coding (JCT-VC) of ITU-T SG16 WP3 and ISO/IEC JTC1/SC29/WG11, Nov. 21-30, 2011, 8 pages, Geneva, CH.
Xu, Jun, et al., "Chroma QP extension and signaling enchancement," Joint Collaborative Team on Video Coding (JCT-VC) of ITU-T SG16 WP3 and ISO/IEC JTC1/SC29/WG11, Apr. 27-May 7, 2012, 11 pages, Geneva, CH.
Flynn, David, et al., "Fidelity adaptive video coding mode," Joint Collaborative Team on Video Coding (JCT-VC) of ITU-T SG16 WP 3 and ISO/IEC JTC 1/SC 29/WG 11 14th Meeting, Jul. 25-Aug. 2, 2013, 9 pages, Vienna, AT.
François, Edouard, et al., "AHG 5: on chroma QP for HEVC Rext," Joint Collaborative Team on Video Coding (JCT-VC) of ITU-T SG16 WP 3 and ISO/IEC JTC 1/SC 29/WG 11 13th Meeting, Apr. 18-26, 2013, 10 pages, Incheon, KR.
Sullivan, Gary, et al., "Meeting report of the 14th meeting of the Joint Collaborative Team on Video Coding (JCT-VC), Vienna, AT, Jul. 25-Aug. 2, 2013," Joint Collaborative Team on Video Coding (JCT-VC) of ITU-T SG 16 WP 3 and ISO/IEC JTC 1/SC 29/WG 11, 14th Meeting, Jul. 25-Aug. 2, 2013, 207 pages, Vienna, AT.

\* cited by examiner

CHROMA QUANTIZATION IN VIDEO CODING

CLAIM OF BENEFIT TO PRIOR APPLICATIONS

This application is a continuation application of U.S. patent application Ser. No. 14/452,485, filed Aug. 5, 2014, published as U.S. Patent Publication 2015/0071344. U.S. patent application Ser. No. 14/452,485 claims the benefit of U.S. Provisional Patent Application 61/875,664, filed Sep. 9, 2013. U.S. patent application Ser. No. 14/452,485, published as U.S. Patent Publication 2015/0071344 and U.S. Provisional Patent Applications 61/875,664 are incorporated herein by reference.

BACKGROUND

The next generation High Efficiency Video Coding (HEVC/H.265) standard, which was developed jointly by the ITU and ISO MPEG, has introduced several new video coding tools in an effort to improve video coding efficiency versus previous video coding standards and technologies such as MPEG-2, MPEG-4 part2, MPEG-4 AVC/H.264, VC1, and VP8 among others. In its first version, this new standard can support the encoding of YUV 4:2:0 8 or 10 bit material using three, well defined profiles, i.e. the Main, Main 10, and Main Still Picture profiles. However, work is still progressing in supporting higher than 10 bit sample precision (bit-depth) as well as different color sampling formats and color spaces, including YUV 4:2:2, YUV 4:4:4, and RGB 4:4:4 among others. The encoding of such materials is of considerable interest primarily for use in several professional applications, such as cinema applications, capture, video editing, archiving, medical imaging etc., but also in several consumer applications such as screen content compression and sharing, remote computing, and gaming among others.

Until recently, existing video codecs have almost always given a much higher priority in coding the luma component of an image. Coding parameters that control the coding characteristics and quality of the luma information are mainly provided at lower levels of the video coding hierarchy such as slice, coding tree block, coding unit, or even the transform block level of HEVC. Control and tuning parameters for all other components are mainly possible at a higher level such as at the Sequence, Picture Parameter Set, or Slice level in conjunction with the modifications of the luma control parameters. For example, in MPEG-4 AVC, luma quantization and the corresponding Quantization Parameter (QP) was controlled with a signaled parameter at the macroblock level. A single offset for each chroma component was provided in the Picture Parameter Sets. Each chroma QP offset controls the QP value of the corresponding chroma component in relationship to the luma QP within each macroblock. However, this relationship is fixed for the entire picture. If it was desired to change the quality of a luma or chroma area, then the other components were also impacted given this very tight relationship. In HEVC, some additional control was also provided since HEVC allows separate chroma quantization offset signaling for each slice. However, using multiple slices may not be desirable or functional for some applications, while the control provided is still somewhat coarse.

For some applications or content, being able to control the quality of some color components independently can be quite important in an attempt to improve overall quality, the compression ratio, as well as the overall user experience. Some areas, for example, may be characterized by different texture or noise characteristics even in the color components, while it may be important to enhance color edges, more or less so than enhancing the same information in luma. Furthermore, for 4:4:4 applications such as video display sharing and remote computing, it may be desirable to encode RGB content where the importance, and thus desired control, of the red and blue color components tends to be higher than the chroma components in the YUV domain. It may also be desirable to encode mixed video content that is a combination of synthetic content, such as computer graphics or applications, with natural images or videos. In this scenario, given the different characteristics of natural versus synthetic content, as well as the possibility that the natural content were originally 4:2:0 images up-converted for display to 4:4:4, having the ability to control chroma quantization parameters could potentially impact coding performance and subjective quality considerably.

What is needed is a method that allows further control of the chroma quantization parameters compared to existing codecs, as well as extending this support for all common color formats (such as YUV, RGV, YCoCg, or YCoCg-R), all common color sampling schemes (such as 4:2:0, 4:2:2. 4:4:4, or 4:4:4:4), as well as a variety of bit depths for each component. Such method should allow signaling and changing of chroma QP offset information within a coding block in a much more flexible manner without placing any limitations on color or sampling formats.

SUMMARY

In order to provide a video coding system in which chroma quantization parameters (QP) can be more flexibly specified, some embodiments of the invention provide a method of signaling additional chroma QP offset values that are specific to quantization groups. In some embodiments, each quantization group explicitly specifies its own set of chroma QP offset values. In some embodiments, a table of possible sets of chroma QP offset values is specified in the header area of the picture or the slice, and each quantization group uses an index to select an entry from the table for determining its own set of chroma QP offset values. The quantization group level chroma QP offset values are then used to determine the chroma QP values for blocks or sets of pixels within the quantization group. In some embodiments, the quantization group chroma QP values are used in conjunction with the luma QP of the block and the chroma QP offset values already specified at higher levels of the video coding hierarchy.

Some embodiments associate chroma QP offset specifications with quantization groups (QGs) that include one or more video data units. In some embodiments, each QG is associated with its own set of chroma QP offset specifications, and in some of these embodiments, the set of chroma QP offset specifications associated with a QG is encoded or embedded within the coding structure of a video data unit in the QG.

In order to further reduce overhead or bit usage, some embodiments specify all available offset values of each component, or combination values of both components, in a higher level, e.g. in a sequence parameter set (SPS), a picture parameter set (PPS), or in the current slice header. In some of these embodiments, the higher level syntax header (SPS/PPS/slice header) lists the different possible offset values in a tabular form, each entry in the table being assigned an index. Then, at the coding unit/quantization group level, some embodiments specify only the index or indices of the desired quantization offset values. Such offsets can be independent of the offset values specified at the PPS or slice header, or conversely be additive to the offset values specified at the PPS or slice header. In order to reduce bitstream size, some embodiments constrain the number of entries in the table to a maximum value.

Encoders in different embodiments use different methods for selecting and assigning the additional chroma QP offset values that are specific to a quantization group. Some embodiments perform a pre-analysis step in which the encoder performs a region level analysis. Some embodiments identify different regions in an image that are of different video content type. In some of these embodiments, different regions with different types of video content are assigned different chroma QP offset values or into different quantization groups. Some embodiments distinguish graphics content from real video content. Some embodiments distinguish 4:4:4 video content that are originally coded in 4:4:4 format from 4:4:4 video content that are up-sampled from 4:2:0 format. Some embodiments discern video content that may have originally been of different bit-depths. These characteristics of video content, in addition to their relationships across color components as well as rate control information, are used by some embodiments to determine the quantization levels or quantization relationships among all color components.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
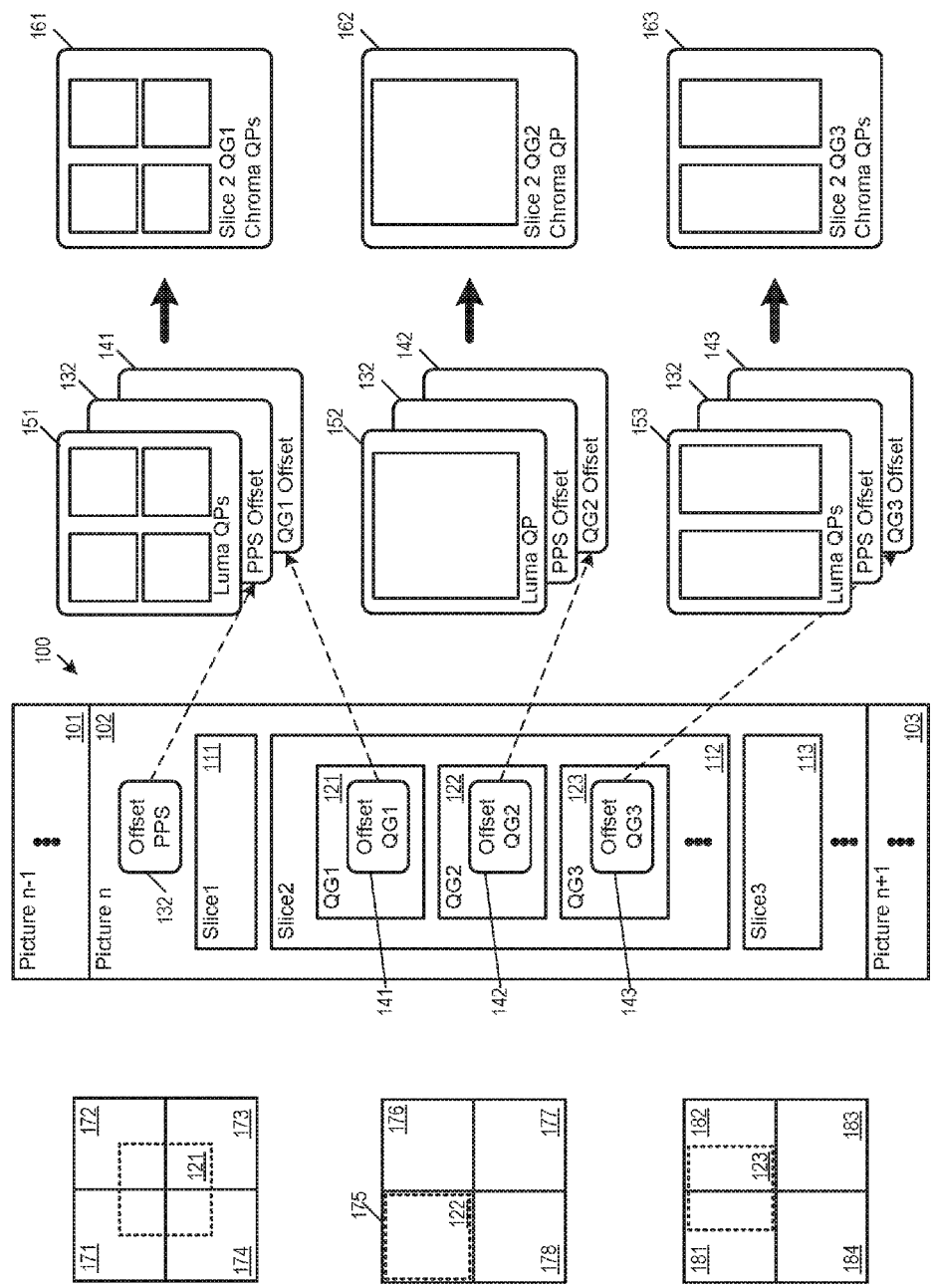
FIG. 1 illustrates a hierarchical video coding structure 100 that includes chroma quantization groups with each having its own set of chroma QP offset specifications.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In order to provide a video coding system in which chroma quantization parameters (chroma QP) can be more flexibly specified, some embodiments of the invention provide a method of signaling additional chroma QP offset values that are specific to quantization groups. In some embodiments, each quantization group explicitly specifies its own set of chroma QP offset values. In some embodiments, a table of possible sets of chroma QP offset values is specified in the header area of the picture or the slice, and each quantization group uses an index to select an entry from the table for determining its own set of chroma QP offset values. The quantization group level chroma QP offset values are then used to determine the chroma QP values for blocks within the quantization group. In some embodiments, the quantization group chroma QP values are used in conjunction with the luma QP of the block and the chroma QP offset values already specified at higher levels of the video coding hierarchy.

Section I below describes methods for specifying additional chroma QP offset values. Specifically, Section I.a describes methods for explicitly specifying additional chroma QP offset values in quantization groups, while Section I.b describes methods for specifying a table of possible chroma QP offset values. Section II then describes different systems and methods for identifying and assigning the additional chroma QP offset values to different regions of an image. Section III describes video encoder and decoder systems that implement some embodiments of the invention, while Section IV describes a computer system with which some embodiments of the invention are implemented.

I. Specifying Additional Chroma QP Offsets a. Specifying Additional Chroma QP Offsets in Quantization Groups

Some embodiments of the invention provide a method of specifying chroma quantization parameter offset values (chroma QP offsets) for coding a sequence of video. The method associates chroma QP offset specifications with chroma quantization groups, each chroma QG encompassing one or more video data units (such as coding units in HEVC). In some embodiments, a set of chroma QP offset specifications associated with a chroma quantization group is encoded or embedded within the coding structure of a video data unit in the chroma quantization group. In some embodiments, the chroma QP offset specification for a chroma quantization group is applied in addition to other chroma QP offset specifications that are specified for a video coding structure at a higher level of the video coding hierarchy (such as a slice or a picture) that encompasses the chroma quantization group. In some embodiments, the chroma QP offsets from the different levels are applied together (by e.g., adding them to the luma QP value) for determining the chroma quantization parameters (chroma QP).

In some embodiments, chroma quantization groups (chroma QGs) are defined in addition to luma quantization groups (luma QGs). A luma QG also encompasses one or more video data units, but is for specifying luma quantization parameters (luma QPs). In some embodiments, chroma QGs may overlap or encompass one or more luma QGs. In other words, different regions within a chroma QG may belong to different luma QGs and consequently have different luma QPs.

For some embodiments of the invention, FIG. 1 illustrates a hierarchical video coding structure 100 that includes chroma quantization groups (chroma QGs) with each having its own set of chroma QP offset specifications. The hierarchical video coding structure 100 includes several pictures 101-103. Among these, the picture 102 includes several slices 111-113. The slice 112 includes several chroma QGs 121-123. The picture 102 has a picture parameter set (PPS) 132 that includes a set of chroma QP offset specifications. The chroma QGs 121-123 are associated with chroma QP offset sets 141-143, respectively.

The hierarchical video coding structure 100 corresponds to a sequence of video images. A sequence of video images is organized into layers of video data units at various levels of the hierarchy, where a video data unit at a higher level encompasses one or more video data units at lower levels. For example, a group of pictures (GOP) is a video data unit at a higher level of the hierarchy than a picture, a picture is a video data unit at a higher level of the hierarchy than a slice of the picture, a slice is video data unit at a higher level of the hierarchy than a coding tree unit, and so forth. In some embodiments, at least some parameters specified for a higher level video data unit are applicable to lower level video data units that the higher level video data unit encompasses. For example, in some embodiments, the picture level chroma QP offset specification for the picture 102 (from PPS 132) is applicable to all chroma QGs encompassed by the picture 102 (e.g., chroma QGs 121-123).

The video coding structure 100 is encoded as a bitstream in some embodiments. Such a bitstream is based on an established video coding format such as the HEVC/H.265 standard or MPEG-4 AVC/H.264 standard. A picture under the H.265 standard can include one or more slices, and each slice can have one of more coding tree units (CTUs). Further, each CTU can be sub-divided into blocks. H.265 also allows the definition of luma quantization groups for quantizing/de-quantizing luma components. Each quantization group allows the derivation of a luma quantization parameter that is specific to the video data units within the quantization group. Once derived, the luma quantization parameter is then used to perform quantization of luma DCT coefficients. Under the H.265 standard, chroma quantization parameters are derived from luma quantization parameters based on offset values provided in the picture or slice layer of an H.265 compliant bitstream. The video coding structure 100 provides chroma QP offset signaling or specification that is in addition to the picture/slice layer chroma QP offsets allowed by the H.265 standard.

The chroma QGs 141-143 are defined ranges in the video coding structure 100. Each of the QGs 141-143 is associated with its own set of chroma QP offset values 141-143. In some embodiments, a quantization group can be a group of video data units that share a same set of QP values. In some embodiments, the signaling for chroma QP offsets in a QG is applied to all video data units within the QG. In some embodiments, the QP offsets are applied starting from the first signaled chroma residual information onward. Any areas preceding the signaling are not associated with the signaled chroma QP offset. In other words, the QG may be "fragmented".

In some embodiment, a QG (chroma or luma) can be defined at different levels or depths of the video coding hierarchy such as coding tree unit, coding unit or transform unit, as these are supported in HEVC. In some embodiments, the definition of a QG for chroma QP offset inherits the definition of a QG for luma components when available.

In some embodiments, the depth, level, and size of a QG (chroma or luma) can be flexibly specified in the bitstream, and may vary from picture to picture. For example, one picture (e.g., 101) can specify its chroma QGs to be at the top level of a coding quad tree (i.e., a QG is a CTU), while another picture (e.g., 103) can specify its chroma QGs to be at a lower level of a coding quad tree (e.g., a QG is a coding block of a quad tree). In some embodiments, higher level parameters (such as a PPS or a slice header) specify at which level of the video coding hierarchy is the QGs of a picture to be defined.

FIG. 1 also illustrates how offsets specified by chroma QGs are used to compute chroma QP values. In some embodiments such as those illustrated by FIG. 1, a first set of Chroma QP offset parameters is already signaled at the PPS 132 (and/or header for slice 112). In some embodiments, chroma QP offset values that are specified at levels above chroma QGs (e.g., PPS and/or slice header) are ignored when the QGs specify their own chroma QP offset values. In some embodiments, the higher level chroma QP offset syntax elements and the QG level chroma QP offsets are considered together to reduce overhead. That is, the adaptation of chroma QP values is done in relationship to both parameter sets together, and the signaled information can be seen as a "second-order" offset. In some of these embodiments, the chroma QP values for the current chroma QG is computed as:

$$QPchroma[i]=QPluma+QPoffset\_pps[i]+QPoffset\_quant\_group[i] \quad (1)$$

(i=0 for the first chroma component; i=1 for the second chroma component)

Where QPluma is the QP of the luma component corresponding to the current chroma quantization group, QPoffset_pps[i] is the i-th chroma component's QP offset from the current PPS (or slice header), and QPoffset_quant_group[i] is the additional offset signaled at the QG level for that component. QPoffset_pps[i]+QPoffset_quant_group[i] thus constitute the overall chroma QP offset of the i-th chroma component.

In some embodiments, the adaptation of chroma QP values is based on chroma QP offset parameters from multiple levels of the video coding hierarchy. For example, in some embodiments, the computation of the chroma QP values considers chroma QP offset values from the PPS as well as from the slice header. In some of these embodiments, the chroma QP value for chroma component i of the current QG is computed as:

$$QPchroma[i]=QPluma+QPoffset\_pps[i]+QPoffset\_slice[i]+QPoffset\_quant\_group[i] \quad (2)$$

Where QPoffset_slice[i] is the i-th chroma component's QP offset from the current slice header, QPoffset_pps[i] is the i-th chroma component's QP offset from the current PPS, and the sum QPoffset_pps[i]+QPoffset_slice[i]+QPoffset_quant_group[i] is the overall chroma QP offset of the i-th chroma component. Some embodiments optionally allow one or more additional chroma QP offset values to be specified in other layers of the video coding hierarchy. To encode or decode a particular coding block, some of these embodiments use some or all of the chroma offset QP values specified along the levels of the video coding hierarchy that encompass (or are applicable to) the particular coding block.

As mentioned, chroma QP values of a chroma QG are computed by adding chroma QP offsets to the luma QP value applicable to the chroma QG. In some embodiments, the luma QP value corresponding to a chroma QG may change within a chroma QG. This is because luma QGs and chroma QGs may overlap such that a chroma QG may encompass coding units that fall into different luma QGs and thus have different luma QP values. Consequently, different coding units within a chroma QG may end up having different chroma QP values (since the chroma QP offsets applicable to the chroma QG are applied to different luma QP values within the chroma QG).

In the example of FIG. 1, the chroma QG 121 has four corresponding luma QP values (QPLuma), because the chroma QG 121 overlaps with four different luma QGs 171-174. These four luma QP values of the chroma QG 121 results in four possible chroma QP values after applying the chroma QP offsets (QPoffset_pps, QPoffset_slice, QPoffset_quant_group) from the PPS offset 132 and QG1 offset 141. A coding unit in the chroma QG 121 therefore can have one of these four possible chroma QP values, depending on the underlying luma QG that the coding unit falls into. Likewise, the chroma QG 123 overlaps with two different luma QGs 181-182, and a coding unit in the chroma QG 123 can have one of two possible chroma QP values depending on the underlying luma QG that the coding unit falls into.

On the other hand, the chroma QG 122 has only one corresponding luma QP value, because the chroma QG 122 falls completely within a luma QG 175 (or encompasses the exact same set of coding units as the luma QG 175). Consequently the coding units in the chroma QG 122 all have the same chroma QP value after applying the chroma QP offsets.

Figure 2A:
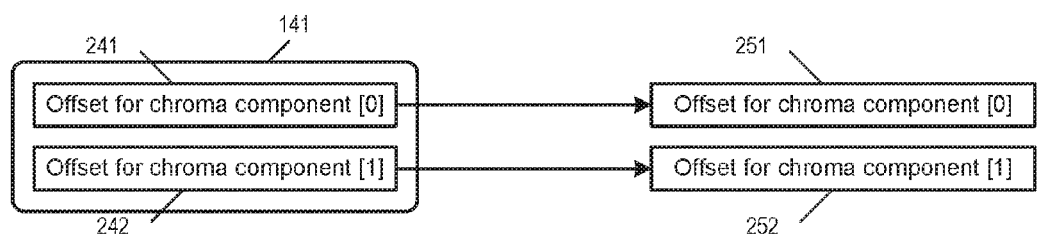
FIGS. 2a-c illustrates several methods for encoding a set of chroma QP offset values for a chroma quantization group.
Figure 2B:
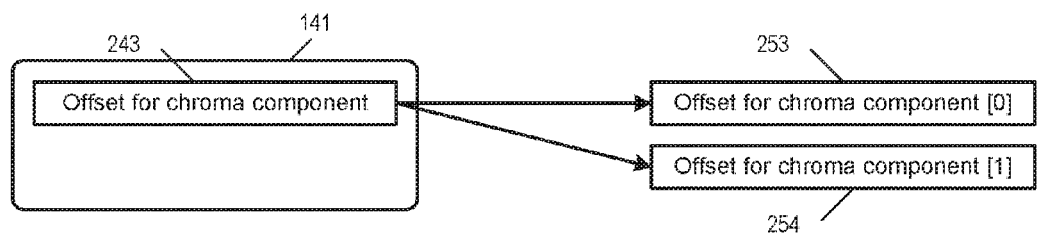
Figure 2C:
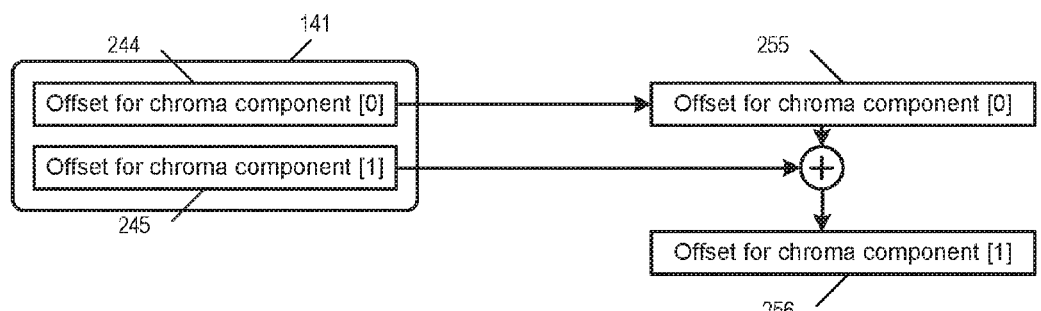

Since there are two chroma components for each luma component for most video coding formats (e.g., YCbCr), in some embodiments, each chroma QP offset for a quantization group is a set of values that includes specification for computing two offset values for the two chroma components. For some embodiments, FIGS. 2a-c illustrates several methods for encoding a set of offset values for the QG 141 of FIG. 1. Some embodiments use only one of these methods for encoding a set of chroma QP offset values. Some embodiments select different methods for different QGs based on QG-specific characteristics.

FIG. 2a illustrates the set of chroma QP offset values as two independent offset values 241 and 242. These two values are directly used as chroma QP offset for component [0] (251) and for component [1] (252). Some embodiments select this method of encoding chroma QP offset when the two chroma components have very little correlation with each other. A further example of this method of encoding chroma QP offset values is described further below by reference to FIG. 5.

FIG. 2b illustrates the set of offset values encoded as one single value 243 that is simultaneously used as the chroma QP offset by both chroma components (253 and 254). Some embodiments select this method when the two chroma components are very similar in their relationships to the luma component. A further example of this method of encoding chroma QP offset values is described further below by reference to FIG. 6.

FIG. 2c illustrates the set of offset values encoded as an immediate offset value 244 and a delta value 245 based on the immediate offset. In this example, the immediate offset value 244 is directly applied as the chroma QP offset of the first chroma component (255) while the sum of the delta value 245 and the immediate value 244 is used as the chroma QP offset value of the second chroma component (256). Some embodiments select this method when the two chroma components differ in their relationships to the luma component by a small offset that can be cheaply encoded in the bitstream with very few bits. This method encodes the second chroma QP offset (for component [1]) in relationship to the first chroma QP offset. That is, the second chroma QP offset is now predicted from the first chroma QP offset (for component [0]). In some embodiments, the chroma QP value for the first chroma component is computed as:

$$QPchroma[0]=QPluma+QPoffset\_pps[0]+QPoffset\_quant\_group[0]. \quad (3)$$

The chroma QP value for the second chroma component is computed as:

$$QPchroma[1]=QPluma+QPoffset\_pps[1]+QPoffset\_quant\_group[0]+QPoffset\_quant\_group[1]. \quad (4)$$

(i=0 for the first chroma component; i=1 for the second chroma component)

As mentioned, some embodiments use chroma QP offset values from multiple different layers of the video coding hierarchy for deriving the final chroma QP value. For some embodiments that use chroma QP offset values from both the PPS and the slice header, the chroma QP value for the first chroma component is computed as:

$$QPchroma[0]=QPluma+QPoffset\_pps[0]+QPoffset\_slice[0]+QPoffset\_quant\_group[0]. \quad (5)$$

The chroma QP value for the second chroma component is computed as:

$$QPchroma[1]=QPluma+QPoffset\_pps[1]+QPoffset\_slice[1]+QPoffset\_quant\_group[0]+QPoffset\_quant\_group[1]. \quad (6)$$

Figure 3:
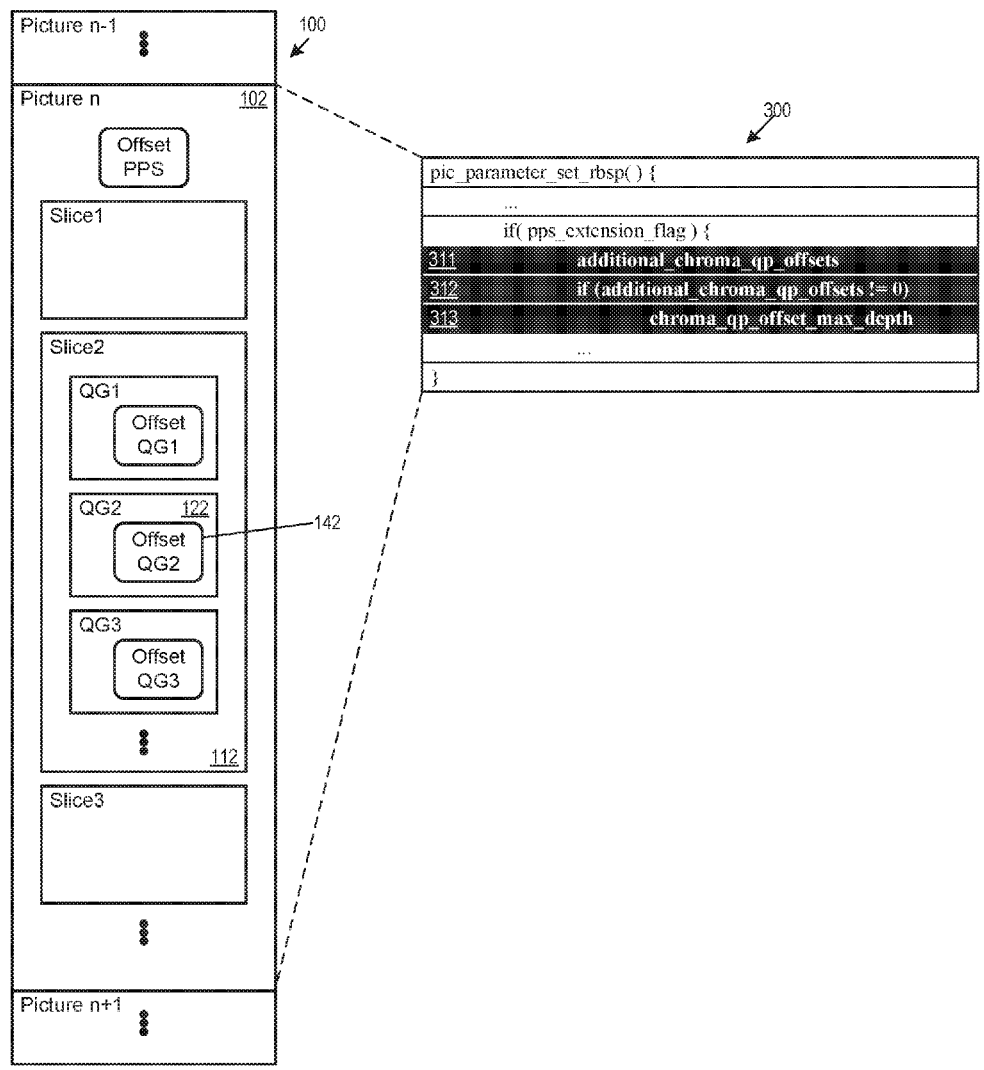
FIG. 3 illustrates an example picture header or picture parameter set (PPS) that specifies a definition of a chroma quantization group.

As mentioned, in some embodiments, the definition of a luma and/or chroma quantization group is specified by parameters that are in the picture level. FIG. 3 illustrates an example picture header or PPS 300 that specifies a definition of a chroma quantization group. The example picture header 300 is associated with the picture 102 of the video coding structure 100. The picture header 300 is described by pseudo code that is modified from the H.265 standard in order to accommodate additional chroma QP offsets (i.e., the adaptation of chroma QP values). In some embodiments, a pseudo code for a video standard (such as the H.265 standard or a modified standard) describes the operations that are required of a video decoder when processing a bitstream that is in compliance with the video standard. A pseudo code also describes the operations that are required of a video encoder when generating a bitstream that is in compliance with the video standard.

For illustrative purposes, the pseudo code of the picture header 300 is shown in FIG. 3 with darkened lines 311-313. Lines 311-313 allows additional chroma QP offset values and defines chroma quantization groups for chroma QP offsets in the picture 102. Specifically, the parameter "additional_chroma_qp_offset" in line 311 informs the decoder that there will be additional chroma QP offset specification in the bitstream. When this variable is not set for a particular picture, the bitstream would not include bits for specifying the additional chroma QP offset for the picture in order to avoid wasting bits.

The parameter "chroma_qp_offset_max_depth" in the line 313 defines the level (and hence the size or the hierarchical depth) of the chroma QG. This parameter can be set to be equal to the size of the entire coding tree unit (CTU) or down to the size of the smallest coding unit possible in the bitstream. Some embodiments allow the specification and signaling of additional chroma QP offsets to occur at any desirable level (e.g., at the CTU level, chroma defined quantization group level, coding unit level, transform unit level, etc.)

In some embodiments, instead of defining quantization groups specifically for chroma QP offsets, the bitstream uses the parameter "diff_cu_qp_delta_depth", which also defines the quantization groups for luma QPs. In some embodiments, if the parameter for defining a quantization group is not available, then the entire picture is assigned the same QP for luma and no QP adaptations for luma are permitted.

Figure 4:
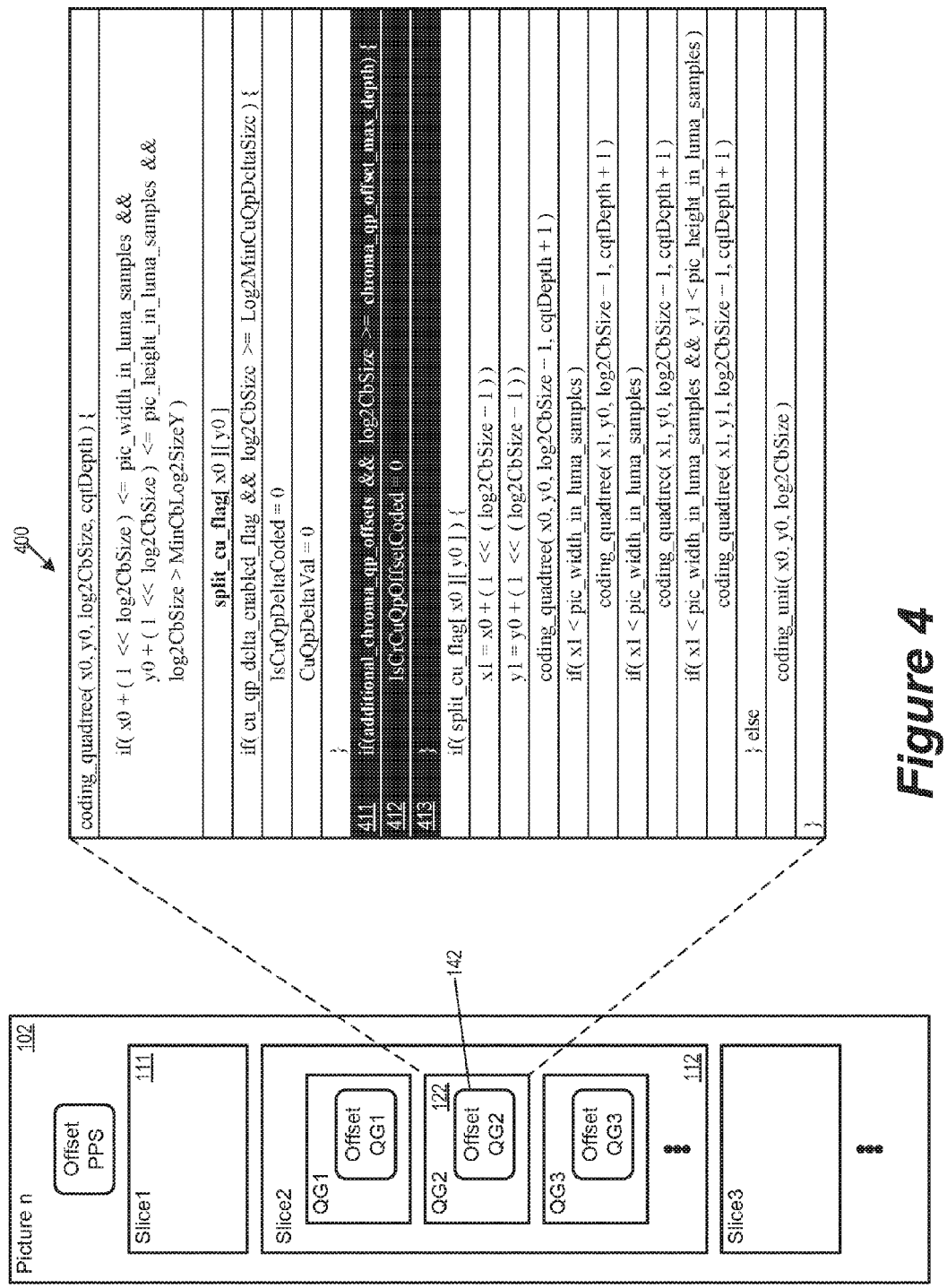
FIG. 4 illustrates an example coding tree unit that can be in a chroma quantization group.

FIG. 4 illustrates an example coding tree unit 400 that can be in a quantization group. The coding tree unit 400 is described by pseudo code modified from the H.265 pseudo code in order to accommodate additional chroma QP offsets. The coding tree unit 400 is in the quantization group 122, which is in the slice 112 of the picture 102.

The pseudo code for the coding tree unit 400 is illustrated with darkened lines 411-413, which are added for the purpose of determining whether the coding tree unit is part of a QG. Specifically, at line 411, the parameter "additional_chroma_qp_offset" (e.g., from the picture header 300) is used to indicate whether additional chroma information is allowed. The parameter "chroma_qp_offset_max_depth" is compared against a variable "log 2CbSize" for determining whether the coding tree unit 400 is in a quantization group (such as the quantization group 122). If so, the pseudo code sets the variable "IsCrCuQpOffsetCoded" to 0 at line 412. For some embodiments, this also initializes the starting point of the chroma quantization group.

Figure 5:
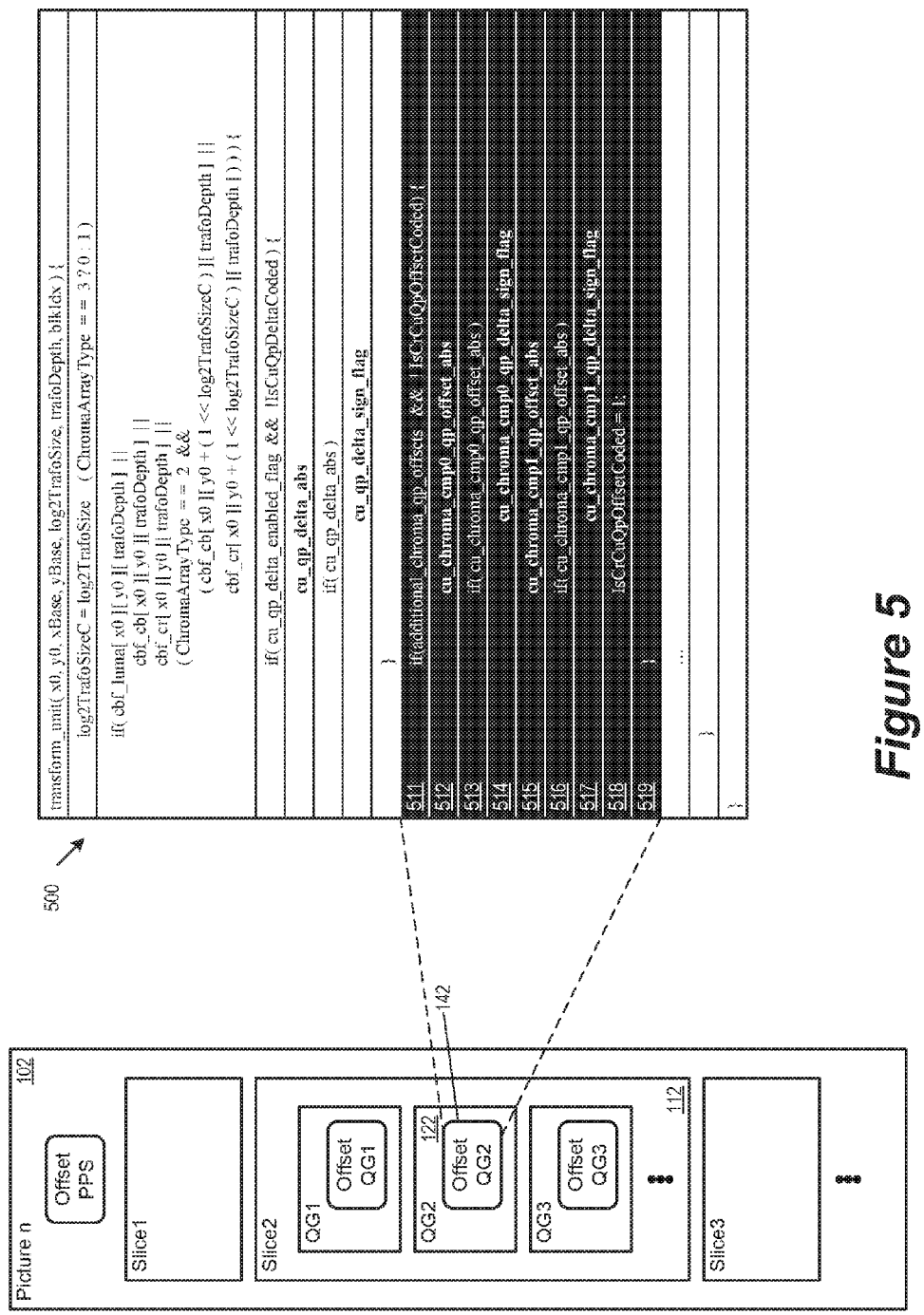
FIG. 5 illustrates the specification of additional chroma QP offsets within a quantization group.

FIG. 5 illustrates the specification of additional chroma QP offsets within the QG 122. As discussed above by reference by FIGS. 3 and 4, the QG 122 has been defined by the picture header 300 to include the coding tree unit 400. The additional chroma QP offsets are specified within a transform unit 500 of the coding tree unit 400. The transform unit 500 is described by pseudo code modified from the H.265 pseudo code in order to accommodate additional chroma QP offsets.

The pseudo code for the transform unit 500 is illustrated with darkened lines 511-519, which are added for the purpose of specifying additional chroma QP offsets. Specifically, at line 511, the parameter "additional_chroma_qp_offset" is used to indicate whether additional chroma information is allowed. The variable "IsCrCuQpOffsetCoded" is used to indicate whether it is necessary to specify (or receive) chroma QP offset information at the transform unit 500. If the chroma QP offset values for the QG 122 have already been coded, there is no need to specify chroma QP offset values again.

If the QG 122 has not already coded a set of chroma QP offset values (i.e., if the variable "IsCrCuQpOffsetCoded" is 0), the transform unit 500 at lines 512-517 specifies chroma QP offset values for the two chroma components. In this instance, the transform unit specifies the set of chroma QP offsets as two independent signed values, with each signed value signaled using a magnitude ("cu_chroma_cmp0_qp_offset_abs" or "cu_chroma_cmp1_qp_offset_abs") and a sign flag ("cu_chroma_cmp0_qp_delta_sign_flag" and "cu_chroma_cmp0_qp_delta_sign_flag"). The pseudo code then sets the variable "IsCrCuQpOffsetCoded" to 1, indicating that the chroma QP offset values of this quantization group have already been specified.

Figure 6:
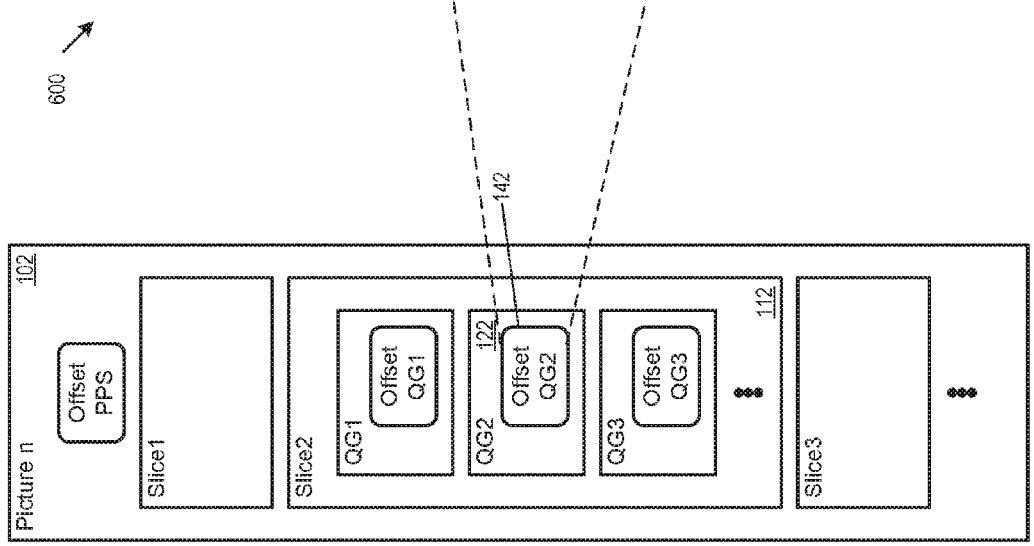
FIG. 6 illustrates the specification of additional chroma QP offsets within a quantization group using a different method for specifying the chroma QP offset values for the two chroma components.

As mentioned earlier by reference to FIGS. 2a-2b, quantization groups in different embodiments specify the chroma QP offset values for the two chroma components differently. FIG. 6 illustrates the specification of additional chroma QP offsets within the QG 122 using a different method for specifying the chroma QP offset values for the two chroma components. FIG. 6 illustrates a transform unit 600 that is described by pseudo code similar to those for the transform unit 500, the only difference being that lines 611-616 specify only one chroma QP offset value (magnitude+sign) for both chroma components. In some embodiments, specifying one chroma QP offset value for both chroma components is sufficient since in most cases the importance of the two color components might not change. The signaling of one or two such parameters can be prefixed, or could be signaled at different higher syntax level locations such as the SPS, PPS, or slice header.

Figure 7:
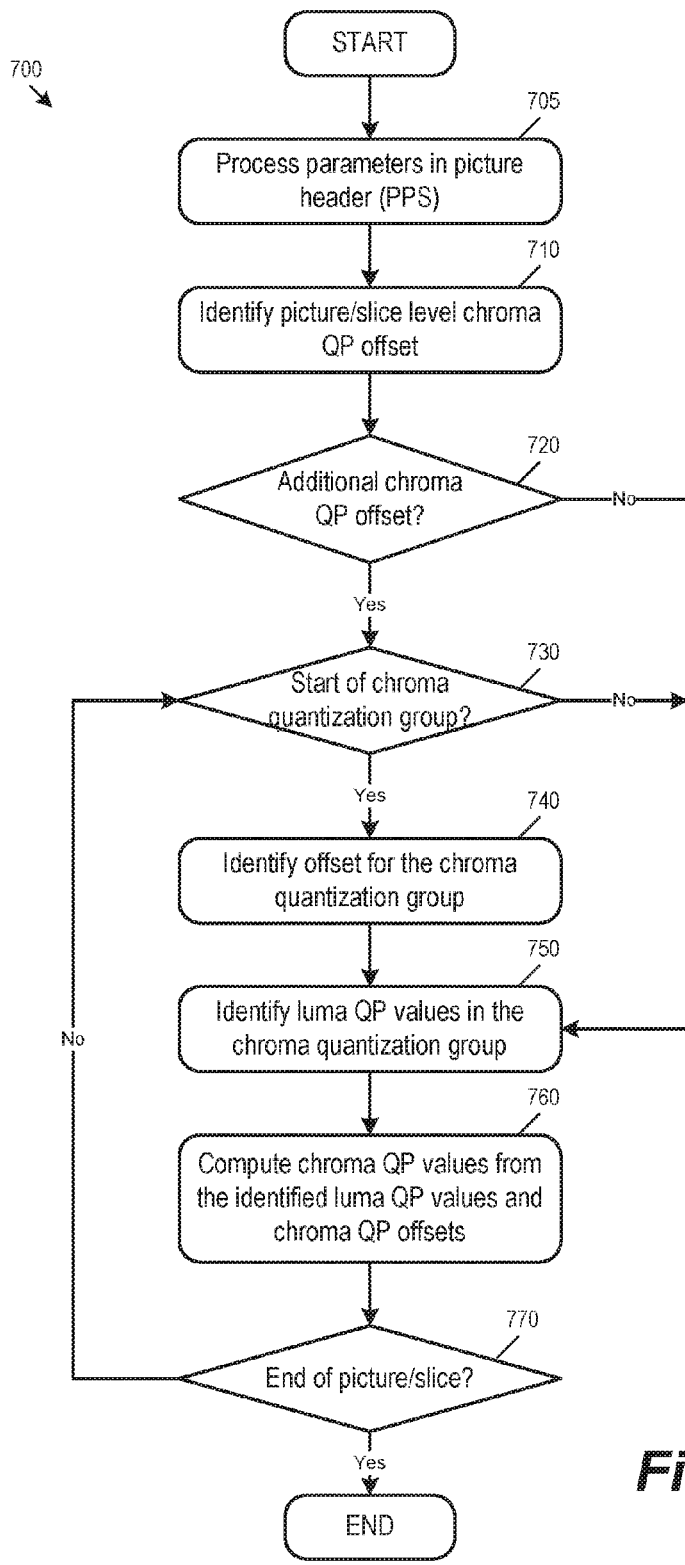
FIG. 7 conceptually illustrates a process for determining chroma QP values from a video bitstream that allows additional chroma QP offset specifications.

For some embodiments, FIG. 7 conceptually illustrates a process 700 for determining chroma QP values from a video bitstream that allows additional chroma QP offset specifications. In some embodiments, the process 700 is performed by a video decoder, which uses this process to perform de-quantization of chroma components when decoding the video bitstream for display. In some embodiments, the process starts when the decoder has received a video bitstream and starts to decode a particular video picture for display or other purposes.

At 705, the process 700 processes parameters in picture header or PPS of the particular video picture. As discussed above by reference to FIG. 3, in some embodiments, the picture header or PPS of a video picture includes flags (e.g., "additional_chroma_qp_offset") for determining whether additional chroma QP offsets are allowed for the video picture. The picture header or PPS also identifies the layer of the video hierarchy in which the chroma quantization groups for the additional chroma QP offsets will be defined (e.g., by setting the variable "chroma_qp_offset_max_depth").

Next, the process identifies (at 710) higher level chroma QP offset values. In some embodiments, this higher level chroma QP offset values are picture level offsets encoded in the picture header (or as a part of the PPS). In some embodiments, this higher level chroma QP offset values are slice level offsets encoded in the slice header. Some embodiments identify multiple higher level chroma QP offset values, including both picture level and slice level.

The process then determines (at 720) whether additional chroma QP offsets are allowed or available for this particular video picture and/or slice. If additional chroma QP offsets are not available, the process proceeds to 750. If additional chroma QP offsets are available, the process proceeds to 730.

At 730, the process determines whether it has reached the start of a chroma quantization group. In some embodiments, the process examines whether it is at the level of the video hierarchy that has been identified as a chroma quantization group. If the process is not at the start of a chroma quantization group (e.g., is already inside a chroma quantization group), the process proceeds to 750. If the process is at the start of a chroma quantization group, the process proceeds to 740. Examples of operations 720 and 730 are discussed by reference to FIG. 4 above.

At 740, the process identifies the chroma QP offset values for the chroma quantization group. In some embodiments, chroma QP offsets are encoded explicitly within the chroma quantization groups as discussed above by reference to FIGS. 5 and 6.

The process then identifies (at 750) luma QP value(s) for the chroma quantization group. As mentioned, in some embodiments, luma QP values are set according to luma quantization groups, which may or may not be the same as chroma quantization groups. Depending on signaling, there can be more or fewer luma quantization groups than chroma quantization groups. In some embodiments, a luma quantization group may contain multiple chroma quantization groups or vice versa. In some embodiments, chroma quantization groups and luma quantization groups may overlap each other. Consequently, different coding units in the same chroma quantization group may have different luma QP values based on luma quantization groups.

Next, the process computes (at 760) chroma QP values. For a decoder, some embodiments compute the chroma QP value from the identified luma QP values and from each identified chroma QP offset. In some embodiments, this is accomplished by adding the luma QP value with all of the identified chroma QP offsets (from the slice/picture level and from the QG level) as illustrated above in Equations (1)-(6).

The process then determines (at 770) whether it has reached the end of the picture (if the higher level chroma QP offset is for the entire picture) or it has reached the end of the slice (if the higher level chroma QP offset is for the slice). If so, the process 700 ends. If not, the process 700 returns to 730 to process the next quantization group.

As shown above by reference to FIGS. 1-6, the chroma QP values are coded predictively by using offsets from the luma QP values. Furthermore, in some embodiments, the offset values are themselves predictively encoded by offsetting from each other, such as QG level offsets being offsets from slice and/or picture level offsets, and/or the offset values of one chroma component being encoded as offsets from another chroma component. In some embodiments, the chroma QP offsets are further predicted from chroma values or offsets of neighboring coding units or blocks, or from chroma values or offsets of a collocated coding unit or block in a neighboring video picture, as they are most likely sufficiently similar to the coding units or blocks of the current chroma quantization group. Some embodiments do not perform prediction for at least some of the quantization groups. In these instances, chroma QP values are encoded explicitly (not as offsets) such that the QP parameters of the luma component are ignored (because there is no need to offset from luma).

Some embodiments use a flag to indicate that a set of chroma QP offset values from a neighboring quantization group will be used for the current quantization group. In some embodiments, this neighboring quantization group is spatially located at the left or at the top of the current quantization group. For example, some embodiments use a flag "cu_qp_update_signal" for indicating whether the chroma QP offset values of a neighboring quantization group will be used. In some embodiments, the flag "cu_qp_update_signal" is signaled before the "cu_chroma_qp_offset_abs" parameter at line 612 of FIG. 6.

If the flag is '1', the current quantization group will provide an update for specifying its own chroma QP offset values. If the flag is '0', the current quantization group will not update its set of chroma QP offset values, but rather inherit its chroma QP offset values from the last specified set of chroma QP offset values (e.g., from the neighboring quantization group at the left) or another previously specified chroma QP offset values (e.g., from the neighboring quantization group at the top, or another neighboring quantization group). If the neighboring chroma QP offset values are not available, some embodiments then use the default QP offset values from the PPS and/or the slice header.

In some embodiments, the flag "cu_qp_update_signal" can take on additional possible values for handling different options for specifying chroma QP offset values. For example, in some embodiments, if the flag is '0', the chroma QP offset values from the left neighboring quantization group are used; if the flag is '1', the chroma QP offset values from the top neighboring quantization group are used; and if the flag is '2', the current quantization group will explicitly specify a new set of chroma QP offset values. Otherwise, the current quantization group will use the default QP offset values from the PPS and/or the slice header. In some embodiments, the chroma QP offset values inherited by the current quantization group are based on the average of the chroma QP offset values of at least two of the neighboring quantization groups (e.g., the left and the top).

To further reduce overhead, some embodiments specify that these additional chroma QP offsets can only be within a small range of values, i.e. from a value $-x$ to $x$. Doing so changes the entropy coding process since it alters the expected statistics of the information to be signaled (i.e. for Context Adaptive Binary Arithmetic (CABAC) coding, or if using a "max-limited" universal variable length coding scheme). In some embodiments, the value of $x$ (i.e., the range) is prefixed for the entire sequence; or is signaled at a higher syntax level such as the PPS, SPS, or slice header. Some of these embodiments accomplish this by specifying $x$ directly, or, if $x$ corresponds to a power of 2, the value $\log_2(x)$. Some embodiments specify $x$ by separating magnitude, i.e. $abs(x)$, and the sign of $x$. In CABAC, the value of $abs(x)$ corresponds to the cMax parameter needed in the binarization process.

b. Specifying Additional Chroma QP Offsets in a Table

In order to further reduce overhead or bit usage, some embodiments specify all possible offset values of each component, or combination values of both components at a higher level syntax, e.g. in sequence parameter set (SPS), picture parameter set (PPS), or in the current slice header. In some of these embodiments, the higher level header (SPS/PPS/slice header) lists the different possible offset values in a tabular form, each entry in the table being assigned an index. Then, at the coding unit/quantization group level, some embodiments specify only the index or indices of the desired quantization offset values. Such offsets can be independent of the offset values specified at the PPS or slice header, or conversely be additive to the offsets values specified at the PPS or slice header. In order to reduce bitstream size, some embodiments constrain the number of entries in the table to a maximum value.

Figure 8:
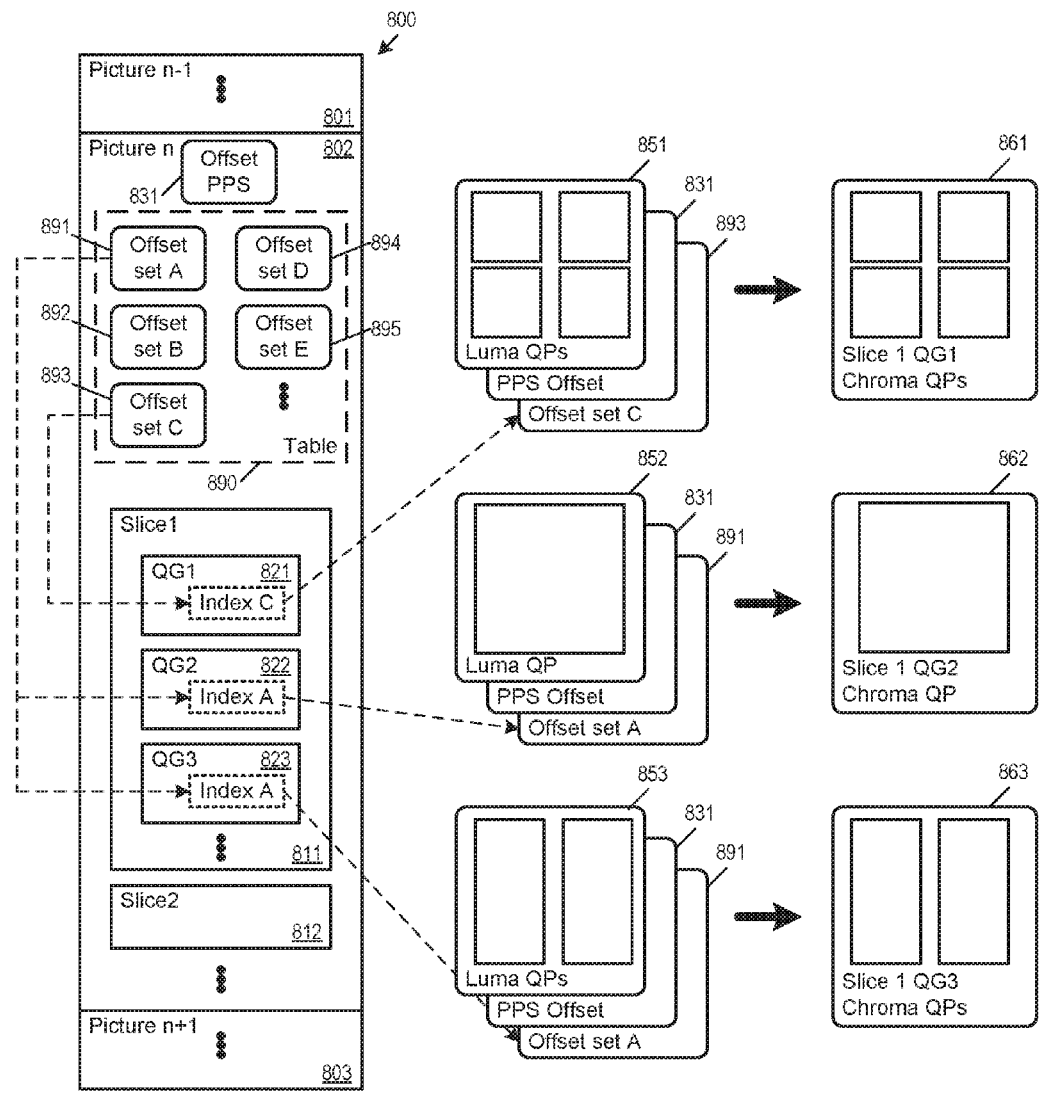
FIG. 8 illustrates a hierarchical video coding structure that includes a table of possible chroma QP offset values at a higher level header.

FIG. 8 illustrates a hierarchical video coding structure 800 that includes a table 890 of possible chroma QP offset values encoded at a higher level header. A chroma QG at a lower level of the video coding structure then uses an index to select one of the possible chroma QP offset values from the table 890 for computing the chroma QP values. The video coding structure 800 is similar to the video coding structure 100. The video coding structure 800 includes several pictures 801-803. Among these, the picture 802 includes several slices 811-812. The slice 811 includes several chroma QGs 821-823. The picture 802 has a picture parameter set (PPS) 831 that includes a set of chroma QP offset specifications that is applicable to all chroma QGs encompassed by the picture 802. As mentioned above by reference to FIG. 1 as well as equations (1) and (2), some embodiments also specify slice level chroma QP offset (not illustrated), and that the adaptation of chroma QP values is based on chroma QP offset parameters from multiple levels of the video coding hierarchy. Unlike the chroma QGs 121-123 of FIG. 1 that specify their own set of chroma QP offset values, each of the chroma QGs 821-823 selects a set of chroma QP offset values from the table 890.

The table 890 is an array that includes multiple entries. Each entry contains a set of chroma QP offsets that can be selected by any of the quantization groups in the picture. In this example, the table 890 includes entries 891-895, which correspond to chroma QP offset sets A, B, C, D, and E, respectively. In some embodiments, each one of the entries can be selected by any number of quantization groups or by none at all. In the example of FIG. 8, both QGs 822 and 823 selects chroma QP offset set A (891), while the QG 821 selects the chroma QP offset set C (893). In some embodiments, the encoder decides which chroma QP offset sets to include and how many chroma QP offset sets to include in the table in order to minimize bitrate.

Once the set of chroma QP offset values has been identified from the table 890, the computation of chroma quantization parameters is similar to that of FIG. 1. In the example of FIG. 8, the luma QP values 851 (from four luma QGs overlapping the chroma QG 821) are applicable to the chroma QG 821, the luma QP value 852 (from a same luma QG) is applicable to the chroma QG 822, and the luma QP values 853 (from two luma QGs overlapping the chroma QG 823) is applicable to QG 823. Adding the luma QP values 851, the chroma QP offset 831 (for the picture 802 and/or for slice 811), and the chroma QP offset C (retrieved from table entry 893 for QG 821) yields chroma QP values 861 for the QG 821. Adding the luma QP values 852, the chroma QP offset 831, and the chroma QP offset A (retrieved from table entry 891) yields chroma QP values 862 for the QG 822. Adding the luma QP values 853, the chroma QP offset 831, and the chroma QP offset A (retrieved from table entry 891) yields chroma QP values 863 for the QG 823.

Figure 9:
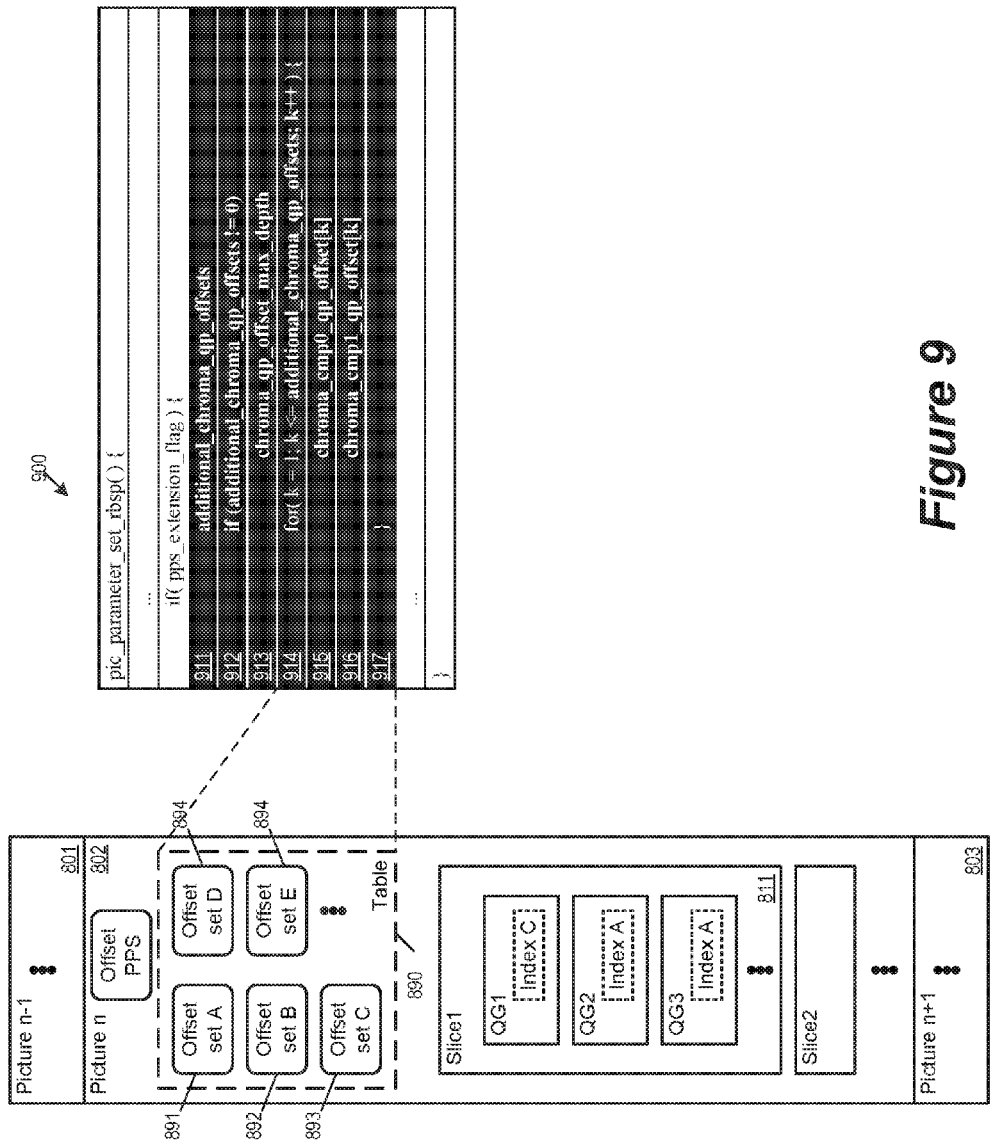
FIG. 9 illustrates an example picture header or picture parameter set (PPS) that encodes a table of chroma QP offsets.

In some embodiments, the table of chroma QP offsets is encoded within the header area of an encoded video picture. FIG. 9 illustrates an example picture header or PPS 900 that encodes the table 890. The picture header 900 is described by pseudo code that is modified from the H.265 standard in order to accommodate additional chroma QP offsets.

The pseudo code for the picture header 900 is illustrated with darkened lines 911-917, which are added for the purpose of defining quantization groups for chroma QP offsets as well as encoding the table 890. Specifically, the parameter "additional_chroma_qp_offset" in line 911 informs the decoder that there will be additional chroma QP offset specifications for the picture 802, and the parameter "chroma_qp_offset_max_depth" in the line 913 defines the level (and hence the size or the hierarchical depth) for QGs in the picture 802. Lines 914-916 of the pseudo code then define a set of chroma QP offset values for each entry (891-895) of the table 890. As illustrated, each entry of the table is assigned a chroma QP offset value for a first component ("chroma_cmp0_qp_offset[k]") and a chroma QP offset value for a second component ("chroma_cmp1_qp_offset[k]").

Since the two chroma components for each entry of the chroma QP offset table are likely correlated, some embodiments use the chroma QP offset value of one chroma component to predict the chroma QP offset value of the other chroma component. In other words, for the k-th entry in the table, if chroma_cmp0_qp_offset[k] represents the offset value of the first chroma component and chroma_cmp1_qp_offset[k] represents the offset value of the second chroma component, then the chroma QP offset for the second chroma component of the k-th entry is computed as:

$$\text{chroma\_cmp1\_qp\_offset}[k]=\text{chroma\_cmp0\_qp\_offset}[k]+\text{delta\_chroma\_cmp1\_qp\_offset}[k] \quad (7)$$

Figure 10:
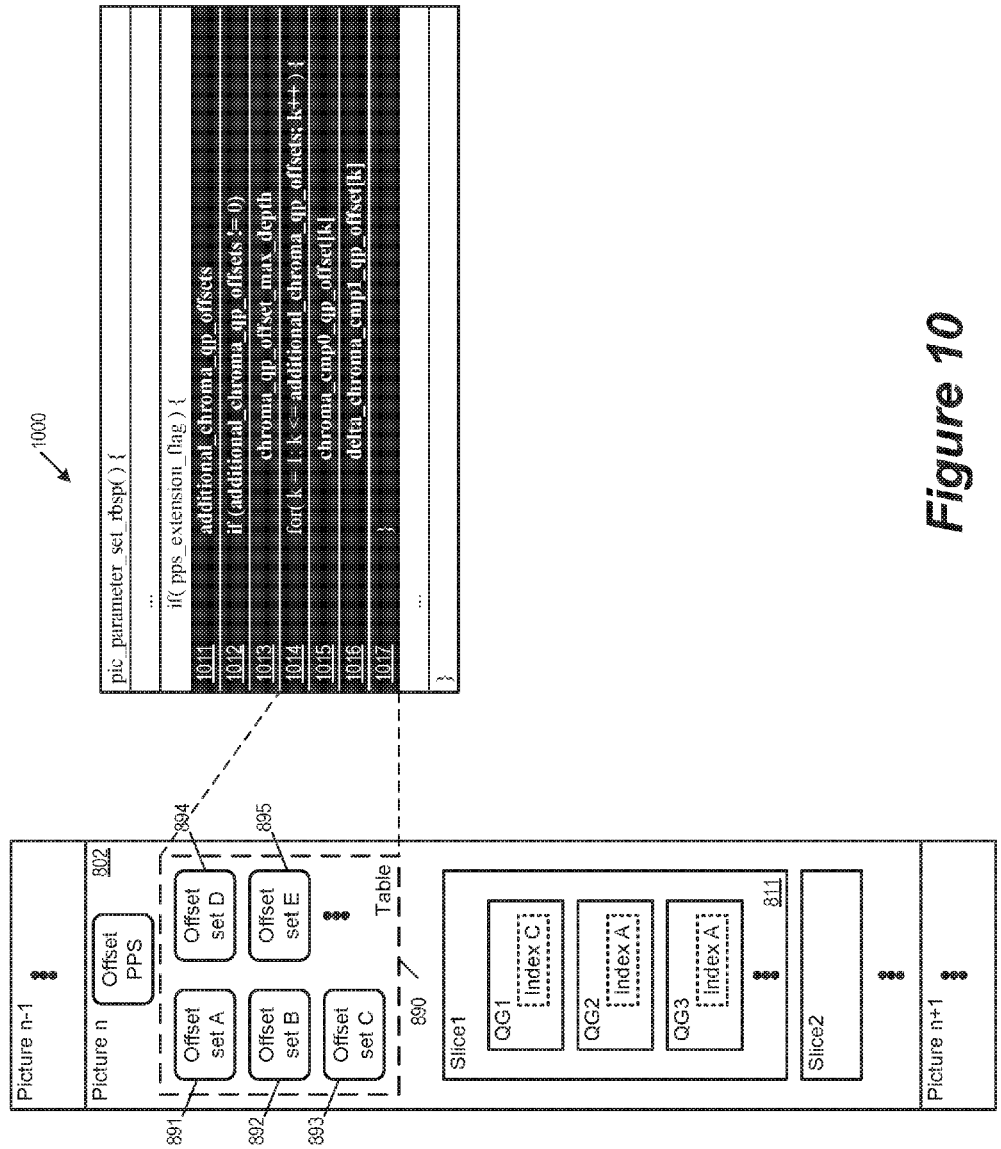
FIG. 10 illustrates a picture header that encodes each entry of a chroma QP offset table predictively.

That is, instead of sending the full offset parameter, i.e. chroma_cmp1_qp_offset[k], some embodiments send a delta parameter, i.e. delta_chroma_cmp1_qp_offset[k] for computing the offset for the second chroma QP offset chroma_cmp1_qp_offset[k]. FIG. 10 illustrates a picture header 1000 that encodes each entry (891-895) of the chroma QP offset table 890 (at lines 1015 and 1016) as chroma_cmp0_qp_offset[k] and delta_chroma_cmp1_qp_offset[k] according to equation (7).

There are other possible methods of predictively encoding the chroma QP offset table in order to reduce bit usage. For example, in some embodiments, the chroma QP offset table entries are predictively coded with respect to each other, such that all of the entries except one are predicted from other entries. One example is to encode each successive entry in the table after the first entry as a delta value predicted from a previous entry in the table. In some embodiments, the first entry is an explicit QP. In some embodiments, the first entry is itself an offset, and therefore is itself also a delta.

Figure 11:
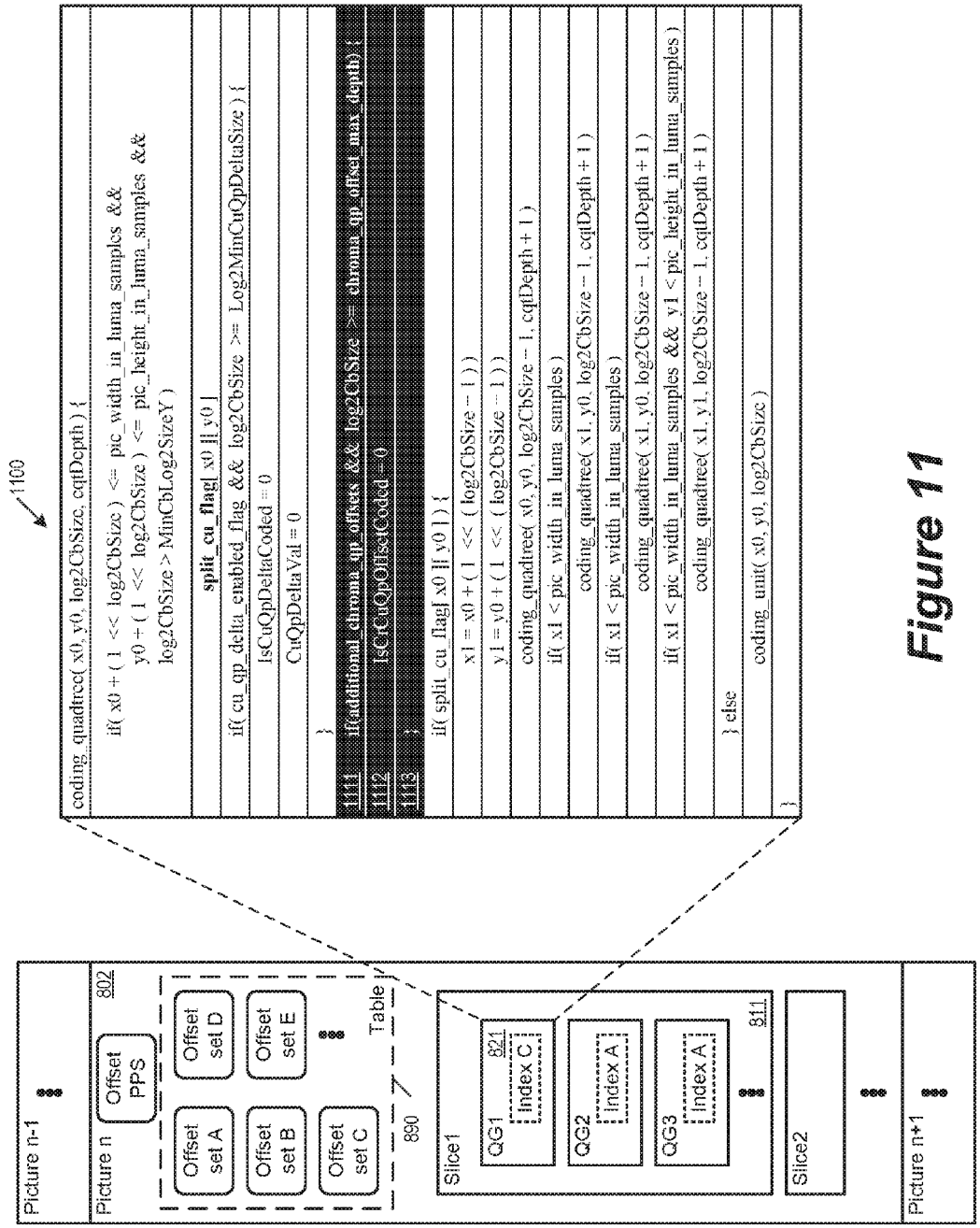
FIG. 11 illustrates an example coding tree unit that can be in a quantization group that uses an index to retrieve chroma QP offset values from a table in a picture header.

FIG. 11 illustrates an example coding tree unit 1100 that can be in a quantization group that uses chroma QP offset values from a table in the picture header. The coding tree unit 1100 is described by pseudo code modified from the H.265 pseudo code in order to accommodate additional chroma QP offsets. The coding tree unit 1100 is in the quantization group 821 of the slice 811. The slice 811 is in the picture 802, whose header or PPS includes the table 890. The pseudo code for the coding tree unit 1100 is identical to the pseudo code for the coding tree unit 400 of FIG. 4, since in some embodiments, there is no difference between a coding tree unit in a quantization group that embeds chroma QP offset values explicitly and a coding tree unit in a quantization group that uses a set of chroma QP offset values from a table.

The pseudo code for the coding tree unit 1100 is illustrated with darkened lines 1111-1113, which are added for the purpose of determining whether the coding tree unit is part of a QG. Specifically, at line 1111, the parameter "additional_chroma_qp_offset" is used to indicate whether additional chroma information is allowed. The parameter "chroma_qp_offset_max_depth" is compared against a variable "log 2CbSize" for determining whether the coding tree unit 1100 is in a chroma quantization group. For some embodiments, this also initializes the starting point of the chroma quantization group.

Figure 12:
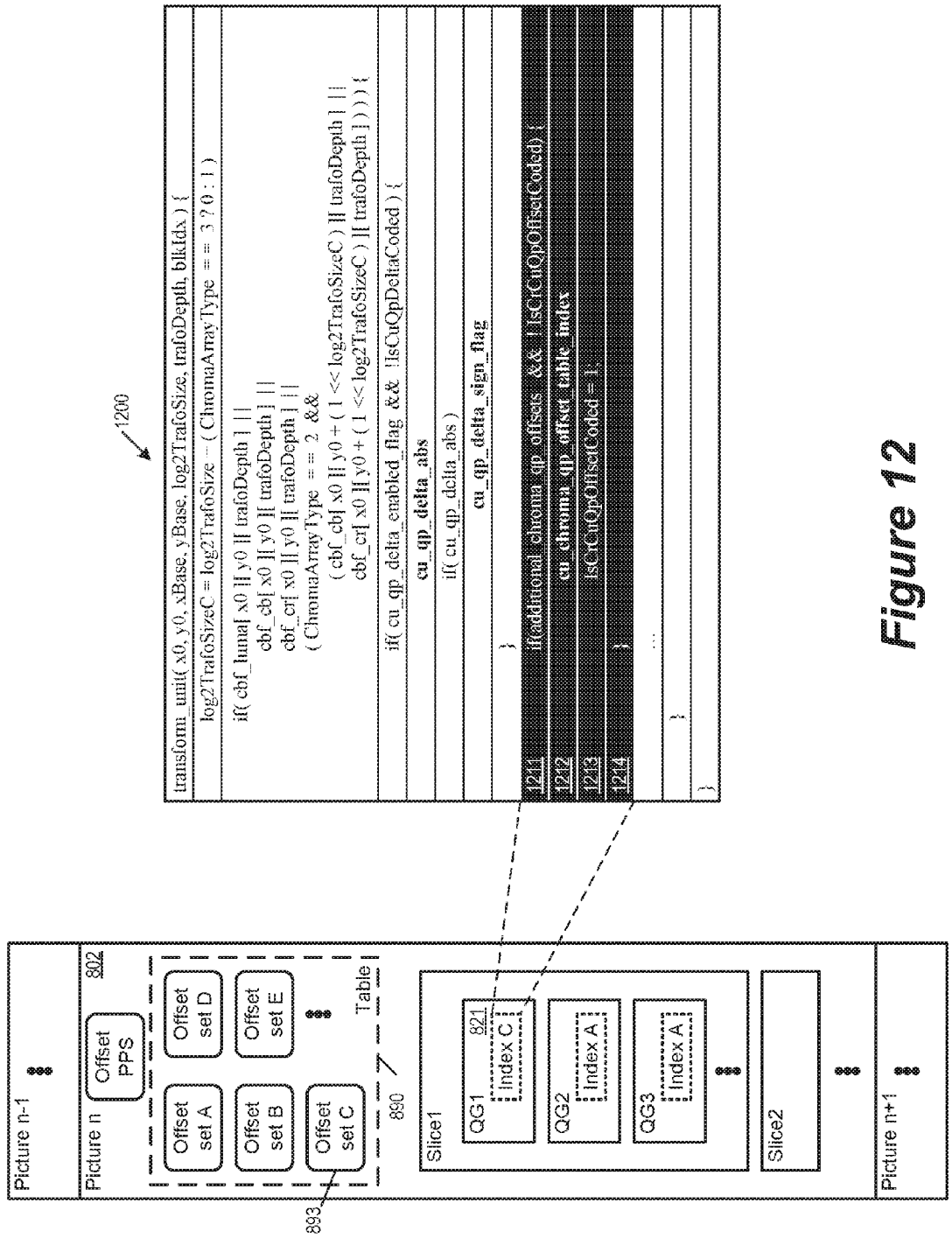
FIG. 12 illustrates a quantization group that uses an index to select an entry in a table of chroma QP offset values.

FIG. 12 illustrates a quantization group that uses an index to select an entry in a table of chroma QP offset values. As discussed above, the quantization group 821 includes the coding tree unit 1100, which in turn includes a transform unit 1200. The transform unit 1200 is described in FIG. 12 by pseudo code modified from the H.265 pseudo code in order to accommodate additional chroma QP offsets.

The pseudo code for the transform unit 1200 is illustrated with darkened lines 1211-1214, which are added for the purpose of specifying the additional chroma QP offsets. Specifically, at line 1211, the parameter "additional_chroma_qp_offset" is used to indicate whether additional chroma information is allowed. The variable "IsCrCuQpOffsetCoded" is used to indicate whether it is necessary to specify (or receive) chroma QP offset information at the transform unit 1200. If the chroma QP offset values for the QG 821 have already been coded, there is no need to specify chroma QP offset values again. If the QG 821 has not already coded a set of chroma QP offset values (i.e., if the variable "IsCrCuQpOffsetCoded" is 0), the transform unit 1200 at lines 1212 specifies an index "cu_chroma_qp_offset_table_index" for selecting an entry from the table 890. For this example, the index value is set to select the chroma QP offset values contained in entry C (893) of the table 890.

Figure 13:
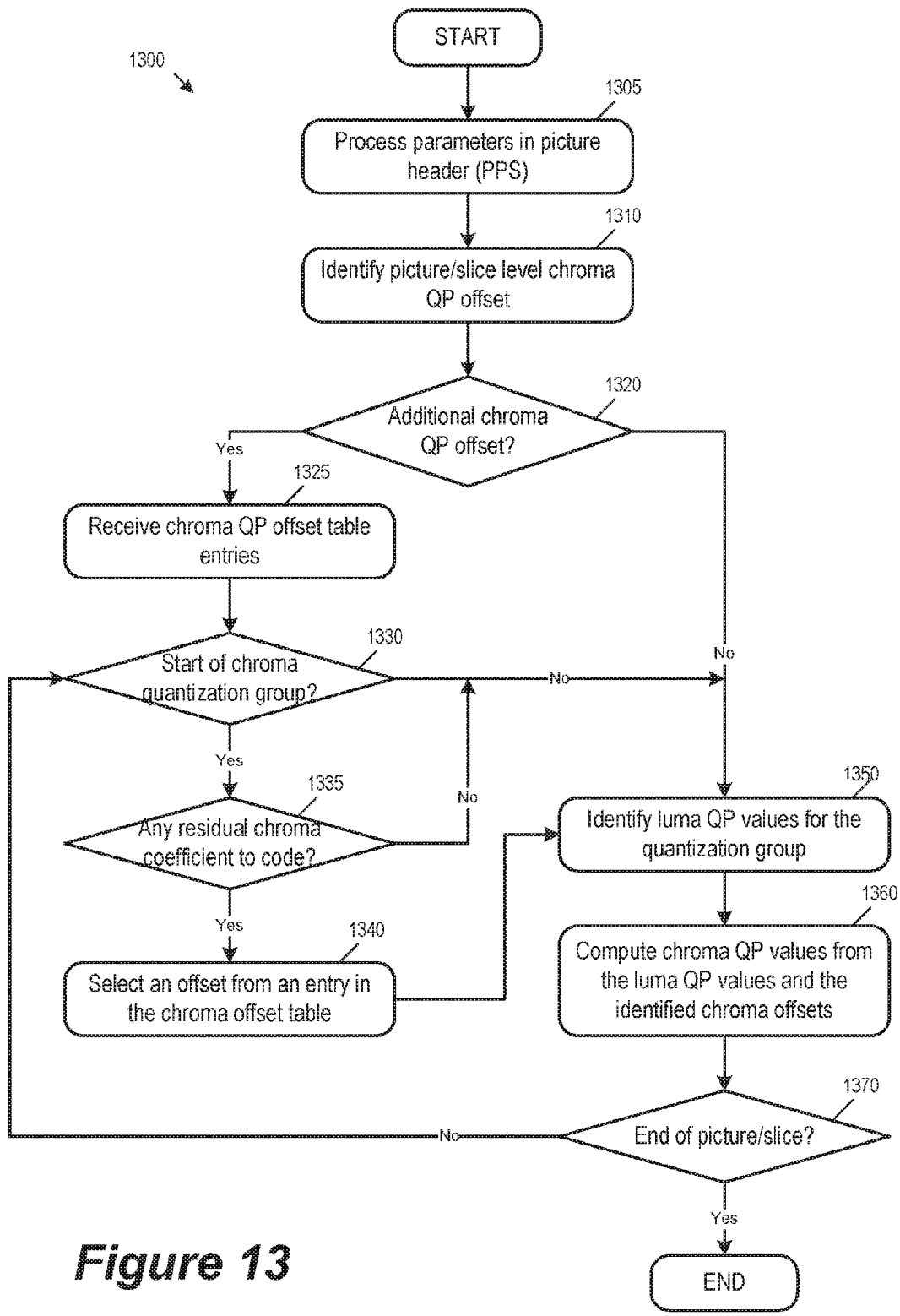
FIG. 13 conceptually illustrates a process for determining chroma QP values from a video bitstream that uses a table of possible chroma QP offset values to implement additional chroma QP offset specifications.

For some embodiments, FIG. 13 conceptually illustrates a process 1300 for determining chroma QP values from a video bitstream that uses a table of possible chroma QP offset values to implement additional chroma QP offset specifications. In some embodiments, the process 1300 is performed by a video decoder, which uses this process to perform de-quantization of chroma components when decoding the video bitstream for display or other purposes. In some embodiments, the process 1300 starts when the decoder has received a video bitstream and starts to decode a particular video picture in some embodiments.

At 1305, the process 1300 processes parameters in picture header or PPS of the particular video picture. In some embodiments, picture header includes flags for determining whether additional chroma QP offsets are allowed for the video picture. The picture header also includes parameters for identifying the layer of the video hierarchy in which the quantization groups for the additional chroma QP offsets will be defined.

Next, the process identifies (at 1310) higher level chroma QP offset values. In some embodiments, this higher level chroma QP offset values are picture level offsets encoded in the picture header (or as a part of the PPS). In some embodiments, this higher level chroma QP offset values are slice level offsets encoded in the slice header. Some embodiments identify multiple higher level chroma QP offset values, including both picture level and slice level.

The process then determines (at 1320) whether additional chroma QP offsets are allowed or available for this particular video picture or slice. If additional chroma QP offsets are not available, the process proceeds to 1350. If additional chroma QP offsets are available, the process proceeds to 1325 to receive chroma QP offset table entries from the bitstream.

Next, the process determines (at 1330) whether it has reached the start of a quantization group. In some embodiments, the process examines whether it is at the level of the video hierarchy that has been identified as a quantization group. If the process is not at the start of a quantization group (e.g., is already inside a QG), the process proceeds to 1350. If the process is at the start of quantization group, the process proceeds to 1335.

At 1335, the process determines whether there are any residual chroma coefficients to encode. In some embodiments, if there are no residual chroma coefficients then the offsets (or their associated indices) are never signaled. Signaling starts when the first non-zero transform coefficient for a chroma block is encountered and the chroma QP offsets become active from that point forward and until the end of chroma quantization group. The chroma QP offsets are 0 until the first non-zero transform coefficient of the chroma block is encountered (hence a region with no chroma coefficients would not have any chroma QP offsets signaling). If there is residual chroma coefficient to encode, the process proceeds to 1340. Otherwise the process proceeds to 1350.

At 1340, the process selects one of the entries in the chroma QP offset table as containing the set of chroma QP offset values for the quantization group. In some embodiments, this operation entails receiving an index from the bitstream and using the received index to select an entry from the chroma QP offset table. In some embodiments that predictively encode the chroma QP offset values in the table, this process includes restoring the chroma QP offset values (of both chroma components) from the prediction or delta values.

The process then identifies (at 1350) luma QP values for the quantization group. As mentioned, in some embodiments, the luma QP values are defined for a quantization group that is the same for the chroma QP values. In some embodiments, quantization groups for luma QP and chroma QP are defined independently.

Next, the process computes (at 1360) chroma QP values. Some embodiments compute the chroma QP value from the identified luma QP values and from each identified chroma QP offset. In some embodiments, this is accomplished by adding the luma QP value with all of the identified chroma QP offsets (from the slice/picture level and from the QG level) as illustrated above in Equations (1)-(6).

The process then determines (at 1370) whether it has reached the end of the picture (if the higher level chroma QP offset is for the entire picture) or it has reached the end of the slice (if the higher level chroma QP offset is for the slice). If so, the process 1300 ends. If not, the process 1300 returns to 1330 to process the next quantization group.

FIGS. 5, 6, and 12 have introduced several different methods that a quantization group can use to specify a set of chroma QP offset values. In some embodiments, quantization groups in different pictures or slices may use different methods for specifying chroma QP offset values. An encoder in some of these embodiments selects the best method that it thinks is needed for the current picture or slice in order to achieve higher flexibility or reduce coding overhead.

Figure 14:
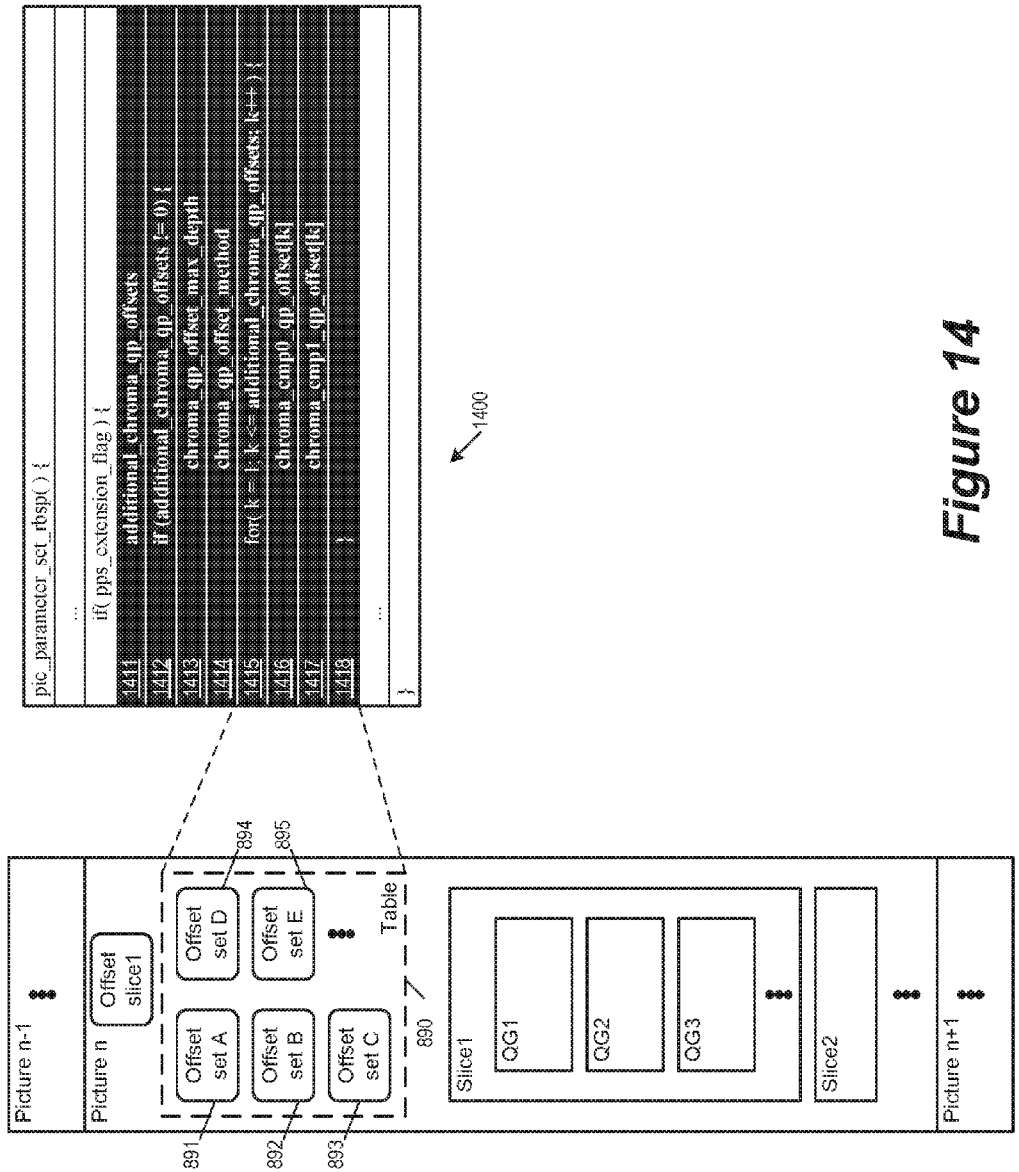
FIG. 14 illustrates the pseudo code for a picture header that includes a selection for a method of specifying additional chroma QP offset values.

For some embodiments, FIG. 14 illustrates the pseudo code for a picture header 1400 that includes a selection for a method of specifying additional chroma QP offset values. The picture header 1400 is similar to the picture header 900 in that it includes flags "additional_chroma_qp_offset" (at line 1411) and "chroma_qp_offset_max_depth" (at line

1413). The picture header 1400 also includes the entries of the chroma QP offset table 890 (at lines 1415-1417). However, unlike the picture header 900, the picture header 1400 also specifies a method by setting "chroma_qp_offset_method" (at line 1414).

Figure 15:
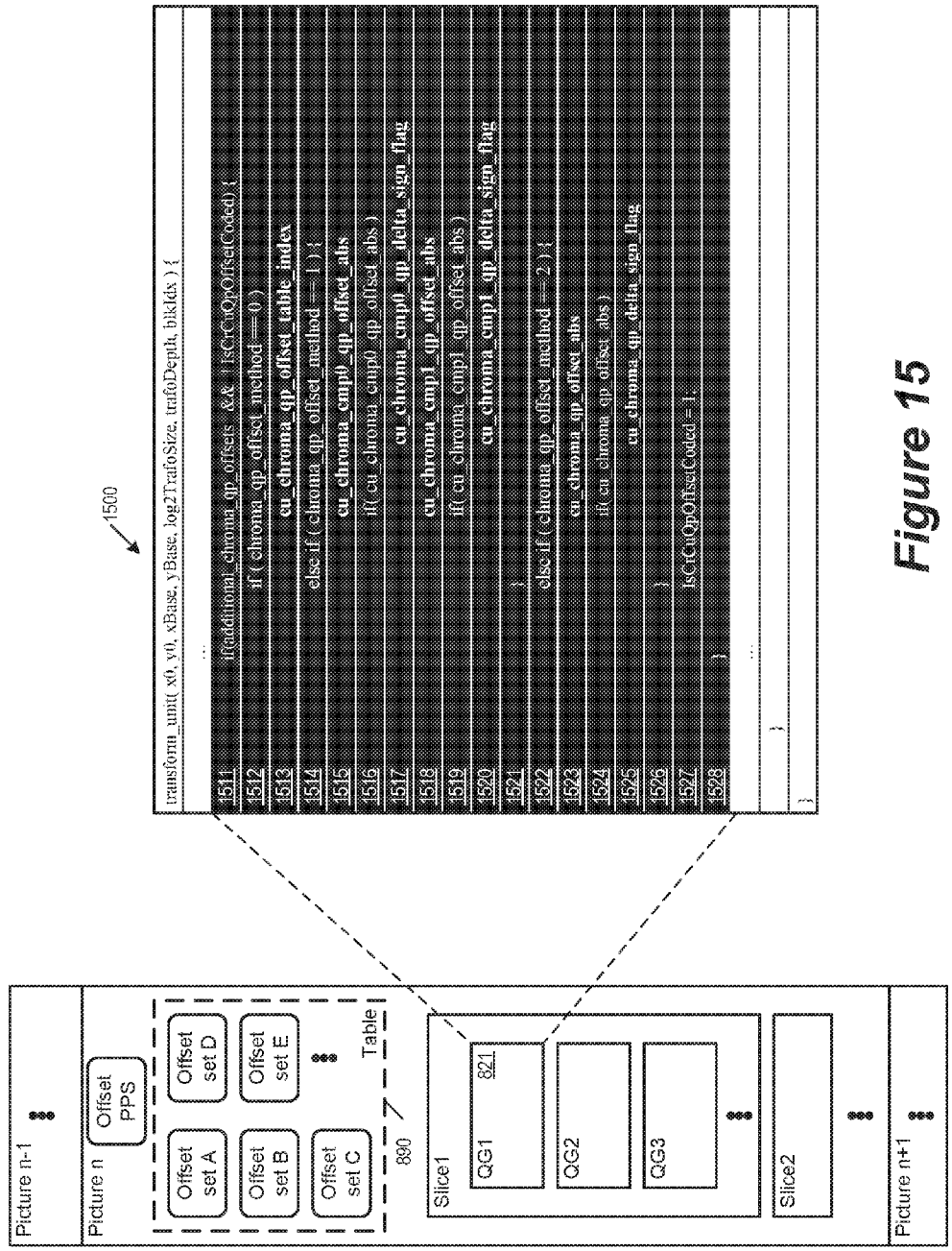
FIG. 15 illustrates the implementation of the pseudo code for a transform unit that is able to specify chroma QP offset values for a quantization group using any of three different methods.

FIG. 15 illustrates the implementation of the pseudo code for a transform unit 1500 that is able to specify chroma QP offset values for a quantization group using any of three different methods. When the method flag "chroma_qp_offset_method" is set to 0 (at line 1512), the transform unit 1500 uses the index "cu_chroma_qp_offset_table_index" to select an entry from the table 890 for computing chroma QP offset values of QG 821 as in FIG. 12. When the method flag is set to 1 (at line 1514), the transform unit 1500 encodes two independent chroma QP offset values for two chroma components (using both magnitude and sign flags) as in FIG. 5. When the method flag is set to 2 (at line 1522), the transform unit 1500 encodes only one chroma QP offset value for both chroma components as in FIG. 6.

II. Assigning Additional Chroma QP Offsets

Encoders in different embodiments use different methods for identifying and assigning the additional chroma QP offset values. In some embodiments, the encoder analyzes images in a video sequence in order to identify the most suitable QP values for quantization (e.g., for optimally balancing quality and bitrate). Some embodiments analyze various regions of the image in order to identify quantization groups that can be optimally encoded by a common set of chroma QP values.

Some embodiments perform a pre-analysis step in which the encoder performs a region level analysis (e.g. for every N×M block with, for example, N=M=4, or an analysis based on object segmentation) to extract for each color component in that region the intensity (e.g. mean value, or lightness for luma and saturation for color), hue, variance/activity/texture characteristics, noise characteristics, and motion characteristics (e.g. motion vector and/or prediction distortion value).

Since video contents of different types can be combined into a same video stream or even a same video image, some embodiments identify different regions in an image that are of different types of video content. In some of these embodiments, different regions with different types of video content are assigned different chroma QP offset values or into different quantization groups. Some embodiments distinguish graphics content from real video content. Some embodiments distinguish 4:4:4 video content that are originally coded in 4:4:4 format from 4:4:4 video content that are up-sampled from 4:2:0 format. Some embodiments discern video content that may have originally been of different bit-depths. These characteristics of video content, in addition to their relationships across color components as well as rate control information, are used by some embodiments to determine the quantization levels or quantization relationships among all color components.

Figure 16:
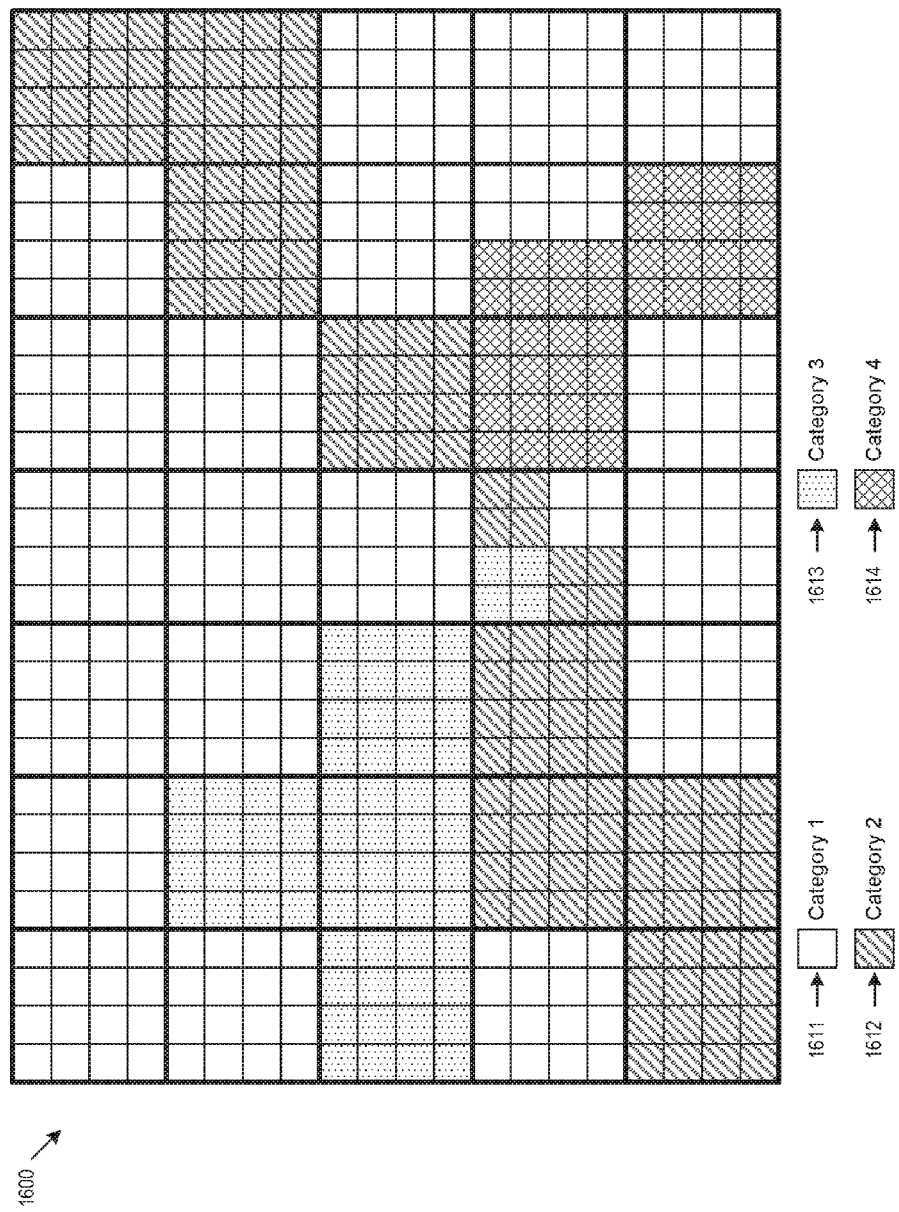
FIG. 16 illustrates example segmentation and categorization of an image.

FIG. 16 illustrates example segmentation and categorization of an image 1600. The image is divided into coding tree units, and each coding tree unit is sub-divided into coding units. The various coding units of the image 1600 are divided into four different chroma QP offset groups. In some embodiments, the four different chroma QP offset groups are signaled in the PPS and the encoder can select the appropriate group to be signaled at the quantization group level. In some embodiments, the chroma QP offsets are explicitly signaled within each quantization group at the time of encoding.

The choice of a chroma QP offset value is determined by the relative visual complexities or textures among the luma and chroma components. The quantization groups of the image 1600 are assigned to different categories 1611-1614 according to their texture levels. For example, areas that appear as flat across all color components belong to a first category 1611, flat luma areas with high texture color components belong to a second category 1612, high texture luma areas with flat color information belong to a third category 1613, while areas with high texture across all three components belong to a fourth category 1614. The encoder in some embodiments may create additional subcategories for each category based on motion and intensity. In some embodiments, additional categorizations are made by taking into account the differences between the two chroma components themselves.

These categorizations could then be used to specify different chroma QP offset sets for the different categories. For example, in some embodiments, the first category 1611 (all flat) is assigned zero or negative QP offsets. In this scenario, a negative chroma QP offset allows for improved chroma quality allocation in those regions, since the improved chroma quality can be more apparent due to the characteristics of all color components. For the second category 1612 (flat luma, high textured color information) a larger, positive, QP offset could be used. In this case, the larger chroma QP allows better control of chroma components so as to not overwhelm the luma components, while some texture masking from the chroma information could still be exploited to guarantee good subjective quality. For the third category 1613 (high textured luma versus flat chroma), some embodiments use a larger negative chroma QP offset to help in guaranteeing slightly better color quality. Some other embodiments use larger positive chroma QP offset to better exploit luma texture masking. For the fourth category 1614 (high texture across all three components), some embodiments use a zero or a positive chroma QP offset to better exploit luma texture masking and to avoid wasting bits for insignificant improvement in chroma subjective quality. It is worth noting that the exact chroma QP offset values assigned to a quantization group is dependent upon the corresponding luma QP values for that quantization group. Different decisions could be made based on subjective or objective quality and bitrate decision mechanisms in other encoders.

In some embodiments, if a limited number of chroma QP offsets are permitted or desired (given the likely increase in bit overhead their specification would require, apart from the determination of the regions and their desired QP offset sets), an additional decision is performed based on the occurrence of each offset set as well as its perceived subjective or objective quality impact.

These criteria are then used by some of these embodiments to "prune" the possible number of chroma QP offset sets signaled within the bit stream, since only the most critical offset sets are now signaled. Regions classified in categories that are "pruned" can still be assigned an offset set that is close enough to the desired values. This is a compromise that could be made, given some subjective or objective weighting process, according to which the chroma QP offsets that are specified are "sub-optimal" for all grouped region types individually, but, given the bit rate limitations, likely provide the best overall/joint performance.

For real time applications where a pre-analysis is not possible, some embodiments use a "pre-fixed decision" of QP offsets. In some embodiments, the decision is based on analysis of the data from the previous pictures that have already been coded. In some embodiments in which chroma QP offsets are explicitly signaled for every quantization group, the decision is made on the fly or dynamically for every actively coded block, based on its selected luma quantization parameter, its various spatial-temporal and color characteristics, as well as coding information from past blocks (i.e. what was the bitrate, bit relationships between luma and chroma, as well as the introduced distortion of other similar or neighboring blocks coded earlier). In some embodiments, the luma quantization parameters are jointly derived with the chroma QP offsets given the same type of bitrate and content characteristic relationships and conditions.

Some embodiments further improve the selection of the chroma QP offsets of a current picture by examining its neighboring pictures. Specifically, some embodiments examine how these neighboring pictures have been coded or will be coded, as well as how these neighboring pictures temporally relate to the current picture and its regions. For example, if the current picture is to be coded as a "key" picture (e.g. as an intra or a "periodic" refresh picture), some embodiments would encode additional chroma QP offsets in order to improve the chroma quality of the current picture. Conversely, if the current picture is a disposable picture or a less important picture in the coding hierarchy, some embodiments would refrain from assigning additional chroma QP offsets in a way that results in higher bit rate (or not to use additional chroma QP offsets at all). For other types of pictures, some embodiments use a more moderate chroma QP offset change to achieve a better compromise between bit rate and quality.

In some embodiments, different chroma QP offset parameters are specified for different scalability layers such as for resolution, quality, bit-depth, etc. Some embodiments apply additional chroma QP offsets to 3D/Multi-view applications where different chroma QP offsets are assigned to different views. For example, stereo masking could be considered to allocate and predict the chroma QP offsets as to reduce overhead and maximize the subjective quality of such a system.

Figure 17:
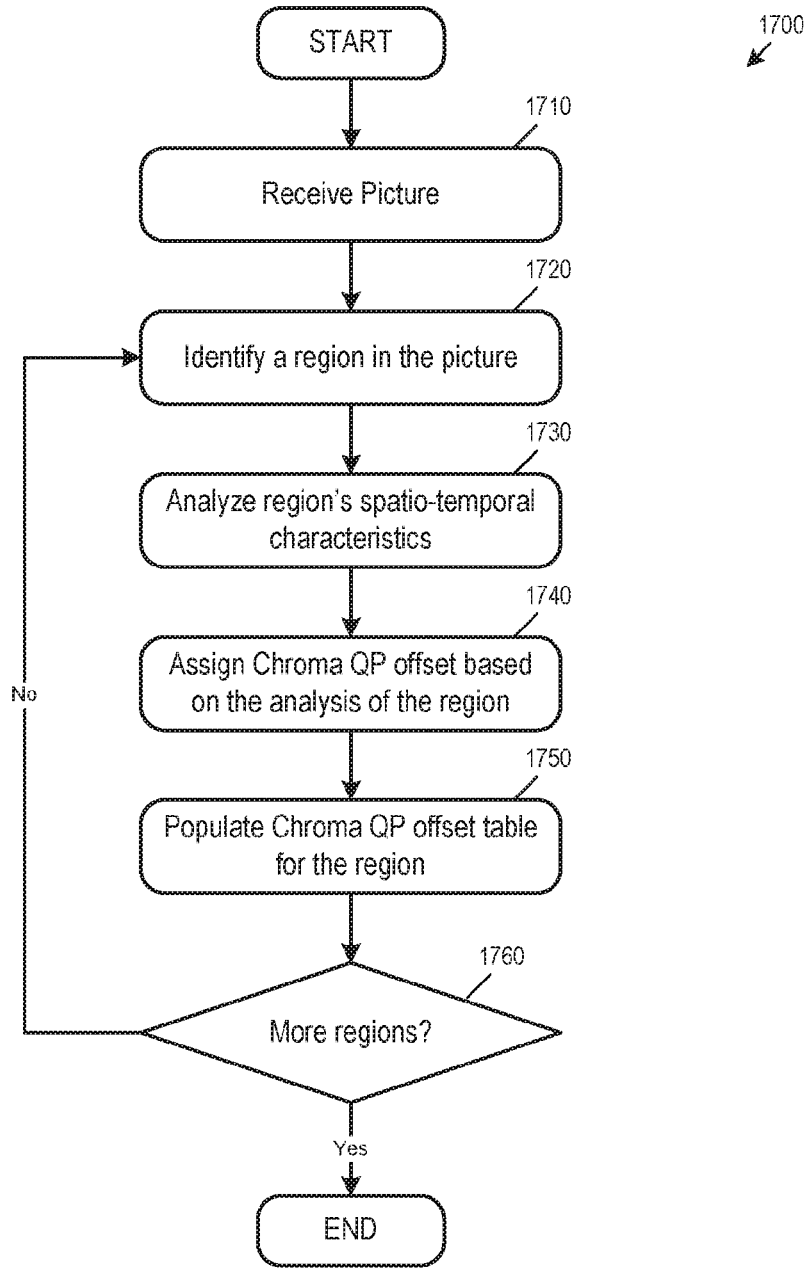
FIG. 17 conceptually illustrates a process 1700 for analyzing different regions of an image and assigning chroma QP offsets accordingly.

For some embodiments, FIG. 17 conceptually illustrates a process 1700 for analyzing different regions of an image and assigning chroma QP offsets accordingly. The process is performed by a video encoder in some embodiments.

The process starts when it receives (at 1710) a video picture. This video picture can be a raw image in an uncompressed video stream or a decoded picture from a compressed video bitstream. The process then identifies (at 1720) a region in the picture that shares common characteristics that make it suitable for the coding units in the region to share a common set of chroma QP offset values. For example, some embodiments identify a region that is originally coded in 4:2:0 format as a region in which higher QP values (and hence positive chroma QP offset) can be used to reduce bitrate. Conversely, some embodiments identify a region that is natively coded in 4:4:4 format as a region in which lower QP values (and hence lower or negative QP offset values) are needed to maintain quality.

The process then analyzes (at 1730) each region's spatial-temporal characteristics. In some embodiments, this analysis includes an analysis of the region's texture/variance/activity, format (4:4:4 or 4:2:0, etc.), noise, motion, bit-depth, or other characteristics that may affect the relationship between luma and chroma as well as between the two chroma components.

Next, the process assigns (at 1740) chroma QP offset values based on the analysis of the region. In some embodiments, the process first identifies the suitable chroma QP value for the region based on the analysis performed in 1730, then subtracts the chosen luma QP value from the identified chroma QP value to obtain the desired overall chroma QP offset value. The process 1740 in some embodiments also dissolves the overall chroma QP offset value into chroma QP offset values at various levels of the video coding hierarchy (e.g., picture, slice, and quantization group). Some embodiments identify the chroma QP offset values for quantization groups by subtracting chroma QP offset values for higher level syntax elements from the overall chroma QP offset value. In some embodiments, this operation is performed by a rate controller as described by reference to FIG. 18 below.

The process then populates (at 1750) the chroma QP offset table with the chroma QP offset values identified for the quantization groups in the region. The process 1700 also encodes their corresponding index values in the quantization groups as discussed in Section I.b above. For some embodiments that specify chroma QP offset values explicitly, the process 1700 encodes the chroma QP offset values within the quantization groups themselves as discussed in Section I.a above.

The process then determines (at 1760) whether there are more regions in the picture that remain to be analyzed. If so, the process returns to 1720. Otherwise, the process 1700 ends.

III. Video Systems

Figure 18:
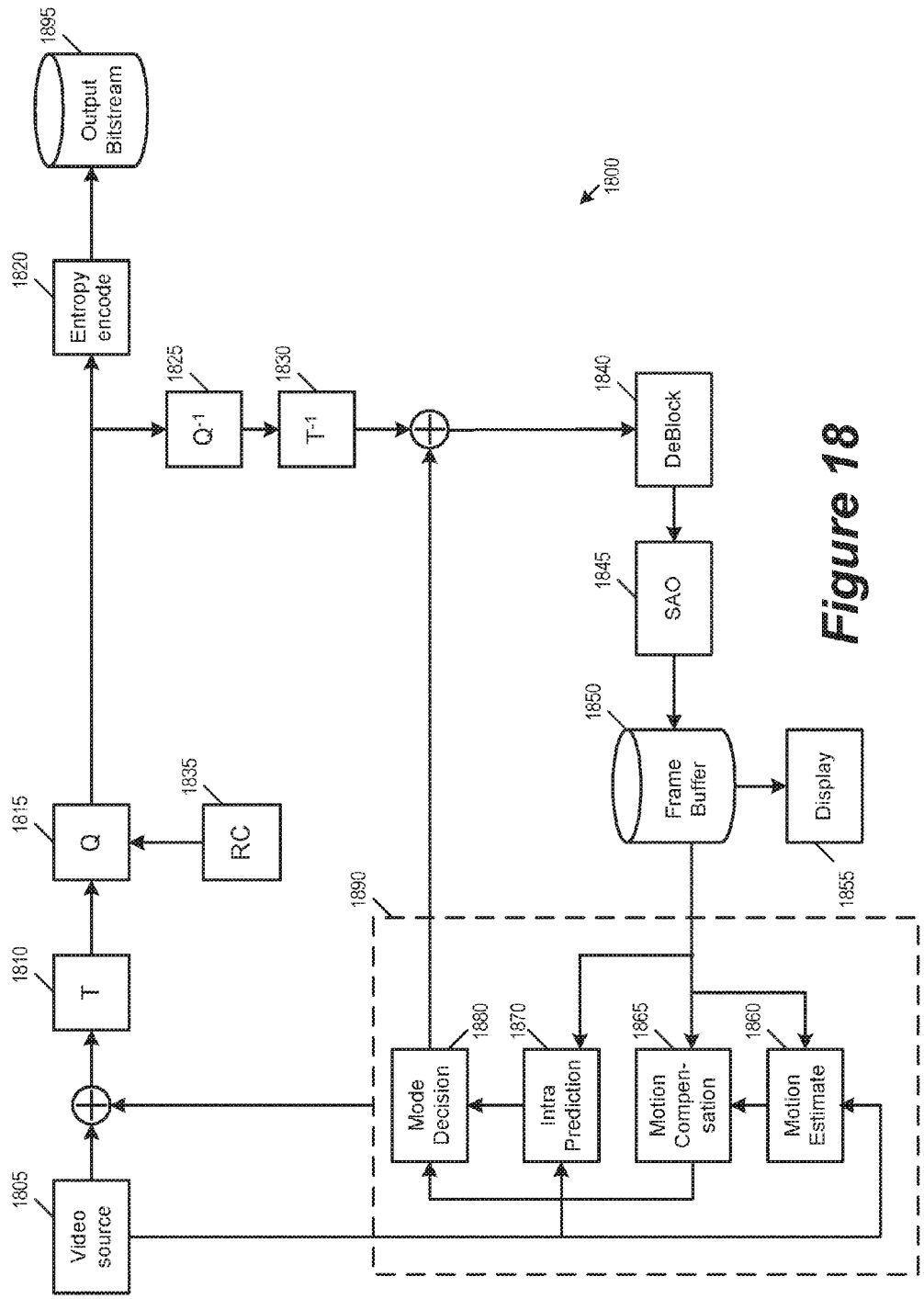
FIG. 18 illustrates a generic video encoder.

FIG. 18 illustrates a generic video encoder 1800 (e.g. HEVC encoder) for some embodiments of the invention. The encoder 1800 receives a video stream from a video source 1805 and produces a compressed, encoded bitstream 1895 to be stored and/or transmitted.

The video encoder includes a transform module 1810, a quantization module 1815, an entropy encoder 1820, an inverse quantization module 1825, an inverse transform module 1830, a deblocking filter 1840, a sample adaptive offset (SAO) filter 1845, a frame buffer 1850, a rate control module 1835, and a prediction module 1890. The prediction module 1890 includes a motion estimation module 1860, a motion compensation module 1865, an intra-prediction module 1870, and a mode decision module 1880. The video encoder 1800 also includes a video display 1855 in some embodiments.

The quantization module 1815 is a module that uses quantization parameters to perform quantization on transform coefficients (e.g., DCT) from the transform module 1810. In some embodiments, the transform module 1810 can be completely bypassed (such as under the transform-bypass mode supported by HEVC) so that the quantization module 1815 receives image values or image prediction error values without transform. The quantization module 1815 applies different QP values for different regions/blocks for each color component. The QP values used by the quantization module 1815 are also coded as luma QP values and chroma QP offsets into the bitstream 1895. In some embodiments, the QP values being used by the quantization module 1815 are determined and supplied by the rate control module 1835.

The rate control module 1835 controls the bitrate of the encoded video bitstream by controlling the QP values that are used by the quantization module 1815 (and the inverse quantization module 1825). In some embodiments, the rate control module 1835 supplies different QP values to the quantization module 1815 for different quantization groups. In order to identify QP values (for luma and chroma) that are the most suitable for quantization (e.g., an optimal balance between quality and bitrate for a given video sequence), the rate control module 1835 in some embodiments performs at least some of the analysis described in Section II above in order to arrive at a luma QP value for each luma quantization group and a set of chroma QP offset values for each chroma quantization group. In some embodiments, the rate controller 1835 also uses the analysis for identifying regions and assigning the (luma and chroma) quantization groups.

In some embodiments, the rate controller 1835 dissolves the set of chroma QP offset values into sets of chroma QP offset values at various levels of the video coding hierarchy. In some of these embodiments, at least some sets of chroma QP offset values are further dissolved into predicted values between the two chroma components as shown in Equations (1)-(7) above. In some embodiments, lower level QP offset values are identified by subtracting higher level QP offset values from the overall chroma QP offset values. For example, some embodiments compute quantization group level chroma QP offsets as:

$$QPoffset\_quant\_group[i]=QPchroma[i]-QPluma-QPoffset\_pps[i]-QPoffset\_slice[i] \qquad (8)$$

These sets of chroma QP offset values are then provided to the entropy encoder 1820 to be encoded into the bitstream 1895. In some embodiments, the rate controller 1835 compiles a table of possible quantization group level offsets and provides the compiled table to the entropy encoder 1820.

The entropy encoder module 1820 is a module that performs entropy encoding (e.g., CABAC) on the quantized transform coefficients, parameters, and other information, and packages them into the bitstream 1895. In some embodiments, the entropy encoder module 1820 receives the chroma QP offset values from the rate controller module 1835 and entropy encodes them into the bitstream. In some embodiments, the entropy encoder 1820 encodes the chroma QP offset values into the PPS area of a picture as a table as described in Section I.b above. In some embodiments, the entropy encoder encodes chroma QP offset values into individual quantization groups as described in Section I.a above.

The deblock module 1840 is a loop filter module that improves the visual quality and prediction performance of a video codec system by smoothing the sharp edges that can form between coding blocks. In some embodiments, the deblock module 1840 uses the overall chroma QP value computed from all of the applicable chroma QP offsets for performing its deblocking operations (i.e., by including the chroma QP offsets of the quantization group and of the picture/slice). In some other embodiments, the deblock module 1840 considers only some of the specified chroma QP offsets, or considers only chroma QP offsets from PPS or slice headers. Some of these embodiments control the deblocking process based on the chroma QP offset values being signals. For example, some embodiments adjust deblocking parameters in order to compensate for chroma QP offset values. Deblocking may also be performed out of loop and as a post-process. In some embodiments, the overall computed chroma QP value or some of the chroma QP offsets are used by other types of in-loop or out of loop post processing such as SAO (e.g., the SAO filter 1845), adaptive loop filter (ALF), or noise addition.

Figure 19:
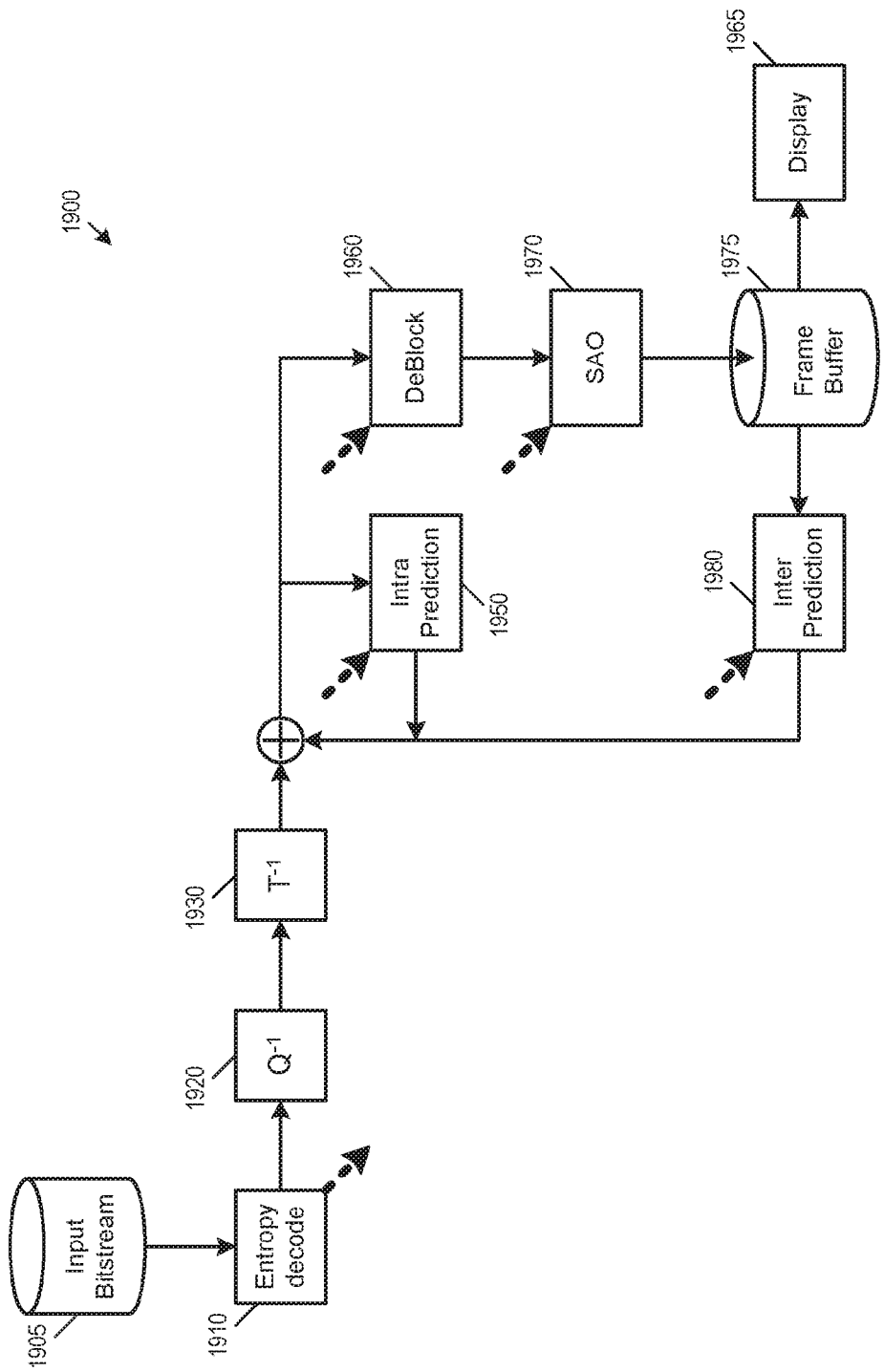
FIG. 19 illustrates a generic video decoder.

FIG. 19 illustrates a generic video decoder 1900 (e.g. HEVC decoder) for some embodiments of the invention. The decoder 1900 receives a bitstream 1905 and decodes it for display by the display module 1965. The decoder 1900 includes entropy decoder 1910, an inverse quantization module 1920, an inverse transform module 1930, an intra-prediction module 1950, an inter-prediction module 1980, a deblock module 1960, an SAO module 1970, and a frame buffer 1975.

The entropy decoder module 1910 is a module that performs entropy decoding on the input bitstream and extracts transform coefficients as well as parameters for other modules in the decoder 1900. Specifically, the chroma quantization information contained in the input bitstream 1905 are extracted by the entropy decoder 1910 and passed to the inverse quantization module 1920. In some embodiments, the chroma quantization information includes the additional chroma QP offset values that are extracted from a table in a PPS, slice header, or from the quantization groups themselves.

The deblock module 1960 of the decoder 1900 performs similar function as the deblock module 1840 of the encoder 1800. Particularly, the deblock module 1960 also uses the final chroma QP value computed from all of the applicable chroma QP offsets for performing its deblocking operations (i.e., by including the chroma QP offsets of the quantization group and of the picture/slice). In some other embodiments, the deblock module 1960 considers only some of the specified chroma QP offsets, or considers only chroma QP offsets from PPS or slice headers. In some embodiments, the overall computed chroma QP value or some of the chroma QP offsets are used by other types of in-loop or out of loop post processing such as SAO (i.e., the SAO filter 1970), ALF, or noise addition.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
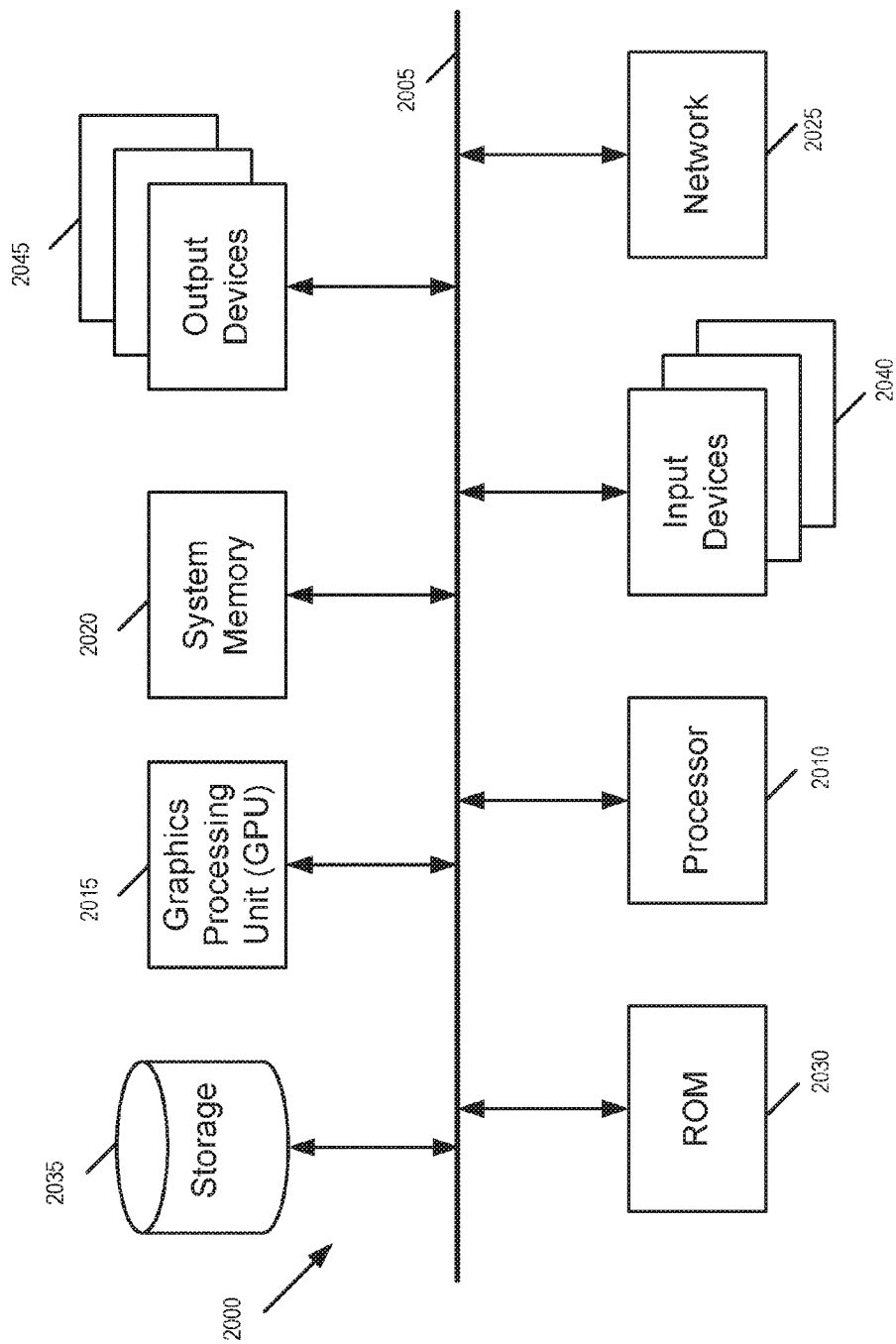
FIG. 20 conceptually illustrates an electronic system with which some embodiments of the invention are implemented.

FIG. 20 conceptually illustrates an electronic system 2000 with which some embodiments of the invention are implemented. The electronic system 2000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2000 includes a bus 2005, processing unit(s) 2010, a graphics processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the GPU 2015, the system memory 2020, and the permanent storage device 2035.

From these various memory units, the processing unit(s) 2010 retrieves instructions to execute and data to process in order to execute the processes of the invention. The processing unit(s) may be a single processor or a multi-core processor in different embodiments. Some instructions are passed to and executed by the GPU 2015. The GPU 2015 can offload various computations or complement the image processing provided by the processing unit(s) 2010.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash memory device, etc., and its corresponding disk drive) as the permanent storage device. Like the permanent storage device 2035, the system memory 2020 is a read-and-write memory device. However, unlike storage device 2035, the system memory 2020 is a volatile read-and-write memory, such a random access memory. The system memory 2020 stores some of the instructions and data that the processor needs at runtime. In some embodiments, the invention's processes are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alphanumeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7, 13, and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory computer readable medium storing a program that is executable by a processing unit, the program comprising sets of instructions for:
- identifying two initial chroma quantization parameter (QP) offset values for two levels of a video coding hierarchy, each initial chroma QP offset value for specifying chroma QPs of video units encompassed by one level of the video coding hierarchy;
- for each of a plurality of quantization groups, identifying an additional chroma QP offset value, each quantization group encompassing a plurality of video units, wherein different additional chroma QP offset values are identified for at least two quantization groups; and
- computing, for each video unit in the plurality of quantization groups, a chroma QP value by adding (i) the initial chroma QP offset values that were identified for the levels of the video coding hierarchy encompassing the video unit and (ii) the additional chroma QP offset value that was identified for the quantization group encompassing the video unit.

2. The non-transitory computer readable medium of claim 1, wherein an identified initial chroma QP offset value specified at a particular level of the video coding hierarchy is for video units that are encompassed by the particular level of the video coding hierarchy.

3. The non-transitory computer readable medium of claim 1, wherein the program further comprises a set of instructions for identifying a luma QP value for the plurality of video units.

4. The non-transitory computer readable medium of claim 3, wherein the set of instructions for computing the chroma QP value for each video unit comprises a set of instructions for adding the identified initial chroma QP offset values and the identified additional chroma QP offset value to the identified luma QP value.

5. The non-transitory computer readable medium of claim 1, wherein a particular additional chroma QP offset value for a particular quantization group is encoded in the video coding hierarchy based on subtracting the identified initial chroma QP offset values from a chroma QP value associated with a raw image associated with the video coding hierarchy.

6. The non-transitory computer readable medium of claim 1, wherein a first identified initial chroma QP value is specified for a picture.

7. The non-transitory computer readable medium of claim 1, wherein the computed chroma QP value is for quantizing a block of video data in the plurality of video units.

8. The non-transitory computer readable medium of claim 1, wherein the computed chroma QP value is for de-quantizing a block of video data in video units.

9. The non-transitory computer readable medium of claim 1, wherein the program further comprises a set of instructions for de-quantizing video units of each quantization group using the computed chroma QP value.

10. The non-transitory computer readable medium of claim 1, the video coding hierarchy being encoded and stored in a bitstream, wherein the program further comprises a set of instructions for decoding the encoded video coding hierarchy using the computed chroma QP value.

11. The non-transitory computer readable medium of claim 1, a video unit being one of a coding tree unit and a coding unit.

12. The non-transitory computer readable medium of claim 1, wherein the plurality of video units in each quantization group is associated with a same chroma QP offset value.

13. The non-transitory computer readable medium of claim 6, wherein a second identified initial chroma QP value is specified for a slice.

14. The non-transitory computer readable medium of claim 13, the second initial chroma QP offset value being stored in the bitstream in a header structure associated with the slice.

15. The non-transitory computer readable medium of claim 13, the slice encompassing the plurality of quantization groups.

16. The non-transitory computer readable medium of claim 1, each quantization group associated with first and second chroma components, the computed chroma QP value associated with the first chroma component of the quantization group, the additional chroma QP offset being a first additional chroma QP offset, wherein the program further comprises sets of instructions for:
- identifying a second additional chroma QP offset value; and
- computing a chroma QP value associated with a second chroma component of the quantization group from the second additional chroma QP offset value.

17. The non-transitory computer readable medium of claim 16, the video coding hierarchy being encoded in a YCbCr format, the first chroma component being a Cb component, the second chroma component being a Cr component.

* * * * *